US009651847B2

(12) United States Patent
O'Keeffe

(10) Patent No.: US 9,651,847 B2
(45) Date of Patent: May 16, 2017

(54) ELECTROPHORETIC INSULATED GLASS UNIT

(71) Applicant: Vlyte Innovations Limited, Shannon Airport (IE)

(72) Inventor: Donal O'Keeffe, Parteen (IE)

(73) Assignee: Vlyte Innovations Limited, Shannon Airport (IE)

( * ) Notice: Subject to any disclaimer, the term of this patent is extended or adjusted under 35 U.S.C. 154(b) by 1 day.

(21) Appl. No.: 14/891,714

(22) PCT Filed: May 16, 2014

(86) PCT No.: PCT/EP2014/060075
§ 371 (c)(1),
(2) Date: Nov. 17, 2015

(87) PCT Pub. No.: WO2014/191233
PCT Pub. Date: Dec. 4, 2014

(65) Prior Publication Data
US 2016/0124284 A1   May 5, 2016

(30) Foreign Application Priority Data
May 31, 2013   (IE) .................................. S2013/0183

(51) Int. Cl.
*G02B 26/00* (2006.01)
*G02B 26/08* (2006.01)
(Continued)

(52) U.S. Cl.
CPC ................ *G02F 1/167* (2013.01); *E06B 9/24* (2013.01); *G02B 5/282* (2013.01); *E06B 2009/2417* (2013.01); *E06B 2009/2423* (2013.01); *E06B 2009/2464* (2013.01); *G02F 2001/1678* (2013.01)

(58) Field of Classification Search
USPC ........ 359/242, 245, 251–254, 265–267, 272, 359/273, 277, 290–292, 296, 298,
(Continued)

(56) References Cited

U.S. PATENT DOCUMENTS 6,632,491 B1   10/2003   Thomsen et al.
8,883,277 B2   11/2014   Janssen et al.
(Continued)

FOREIGN PATENT DOCUMENTS

EP   0709712 A2   5/1996

OTHER PUBLICATIONS

Author Unknown, "Thermal performance of windows, doors and shading devices—Detailed calculations," ISO Standard 15099:2003, Edition 1, ISO/TC 163, Nov. 15, 2003, International Organization for Standardization, www.iso.org/iso/home/store/catalogue_tc/catalogue_detail.htm?csnumber=26425, 2 pages (Abstract).
(Continued)

*Primary Examiner* — Joseph P Martinez
*Assistant Examiner* — Brandi Thomas
(74) *Attorney, Agent, or Firm* — Withrow & Terranova, P.L.L.C.

(57) ABSTRACT

An electrophoretic insulated glass unit (IGU) comprises an electrophoretic laminate and a pane spaced apart from the electrophoretic laminate, the respective inner faces of the laminate and the pane defining a sealed cavity there between. An outer face of the electrophoretic laminate is in contact with an environment. One inner face of the cavity has a coating that is transparent to visible light and which rejects infrared light greater than a cut-off wavelength. The electrophoretic laminate includes an electrophoretic device including charged particles of at least one type in an electrophoretic cell, the particles being responsive to an electric
(Continued)

field applied to the electrophoretic device to move between: a first extreme light state in which particles are maximally spread within the cell to lie in the path of sunlight through the cell and to strongly absorb visible sunlight transmitted through the cell and a second extreme light state in which the particles are maximally concentrated within the cell to remove them from the path of sunlight through the cell and to substantially transmit visible sunlight through the cell. The coating is arranged to direct thermal radiation emitted by the charged particles to the environment in contact with the outer face, and the sealed cavity is arranged to direct thermal conduction diffusing from the charged particles to the environment in contact with the outer face.

20 Claims, 12 Drawing Sheets

(51) Int. Cl.
    *G02F 1/29* (2006.01)
    *G02F 1/167* (2006.01)
    *G02B 5/28* (2006.01)
    *E06B 9/24* (2006.01)

(58) Field of Classification Search
    USPC .......................................... 359/315–317, 322
    See application file for complete search history.

(56) References Cited

U.S. PATENT DOCUMENTS

| | | |
|---|---|---|
| 2006/0038772 A1 | 2/2006 | Amundson et al. |
| 2008/0115428 A1 | 5/2008 | Schlam et al. |
| 2010/0060825 A1* | 3/2010 | Jang ...................... B82Y 20/00 349/86 |
| 2010/0328758 A1* | 12/2010 | Sikharulidze ........... G02F 1/167 359/296 |
| 2013/0128336 A1 | 5/2013 | Dean et al. |

OTHER PUBLICATIONS

Author Unknown, "Glass in building—Determination of light transmittance, solar direct transmittance, total solar energy transmittance, ultraviolet transmittance and related glazing factors," ISO 9050:2003, Edition 2, ISO/TC 160/SC 2, Aug. 15, 2003, International Organization for Standardization, www.iso.org/iso/home/store/catalogue_tc/catalogue_detail.htm?csnumber=35062, 2 pages (Abstract).

Author Unknown, "Planibel LOW-E," Asahi Glass Company (AGC), Infosheet, Date Unknown, Rugby, United Kingdom, YourGlass, 9 pages.

Author Unknown, "Special Function Glazing," SAGE Electrochromics Guide Specification, Section 08 88 00, ASL-063.3, 2013, Faribault, Minnesota, SAGE Electrochromics, Inc., 10 pages.

Author Unknown, "SGG Planitherm® Ultra N/NII: Advanced performance low-E glass," Saint-Gobain Glass Climate, Jul. 17, 2014, Eggborough, United Kingdom, Saint-Gobain Glass UK Ltd., 2 pages.

International Search Report and Written Opinion for International Patent Application No. PCT/EP2014/060075, mailed Jun. 30, 2014, 10 pages.

International Preliminary Report on Patentability for International Patent Application No. PCT/EP2014/060075, mailed Dec. 10, 2015, 7 pages.

\* cited by examiner

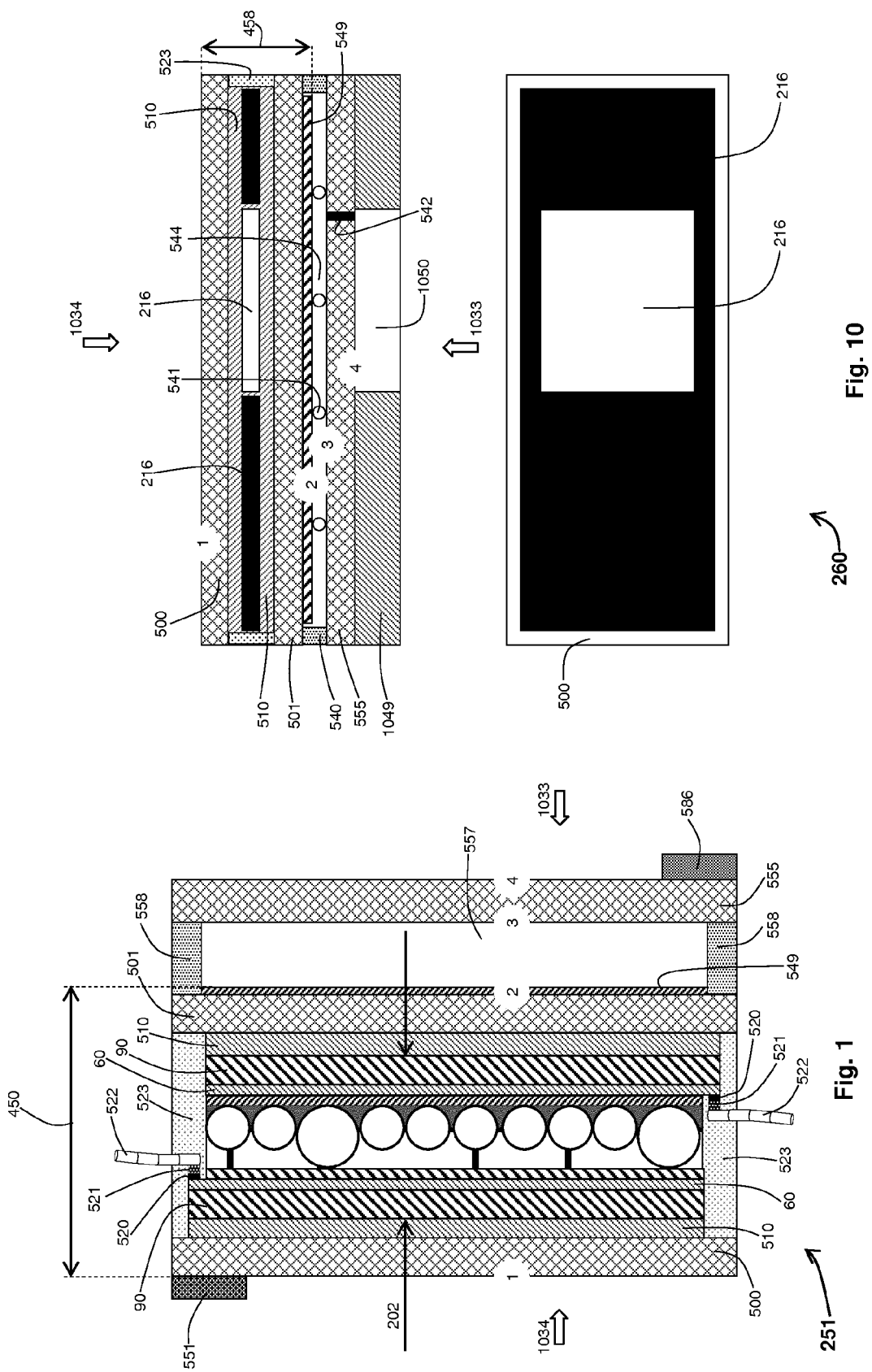

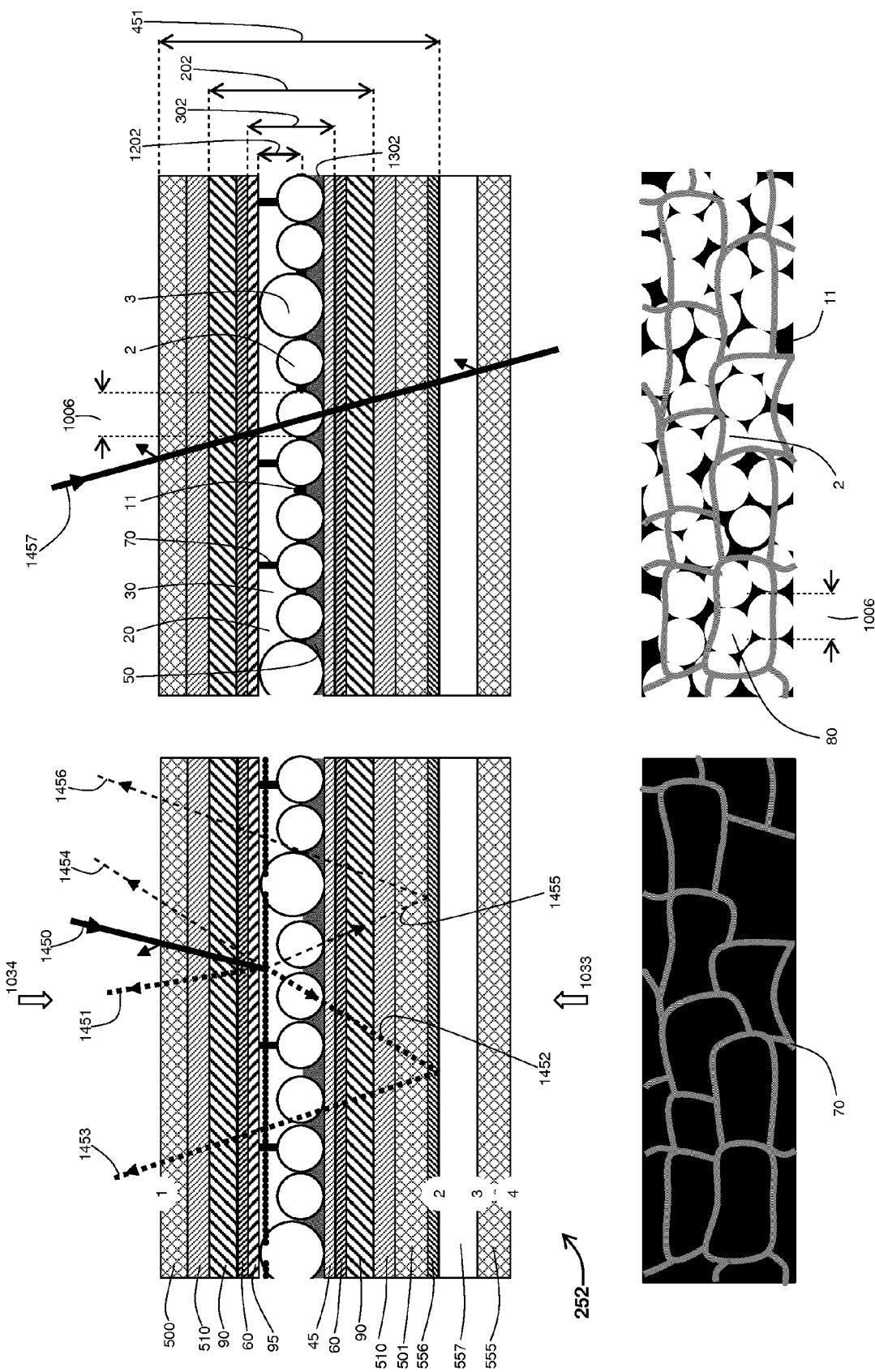

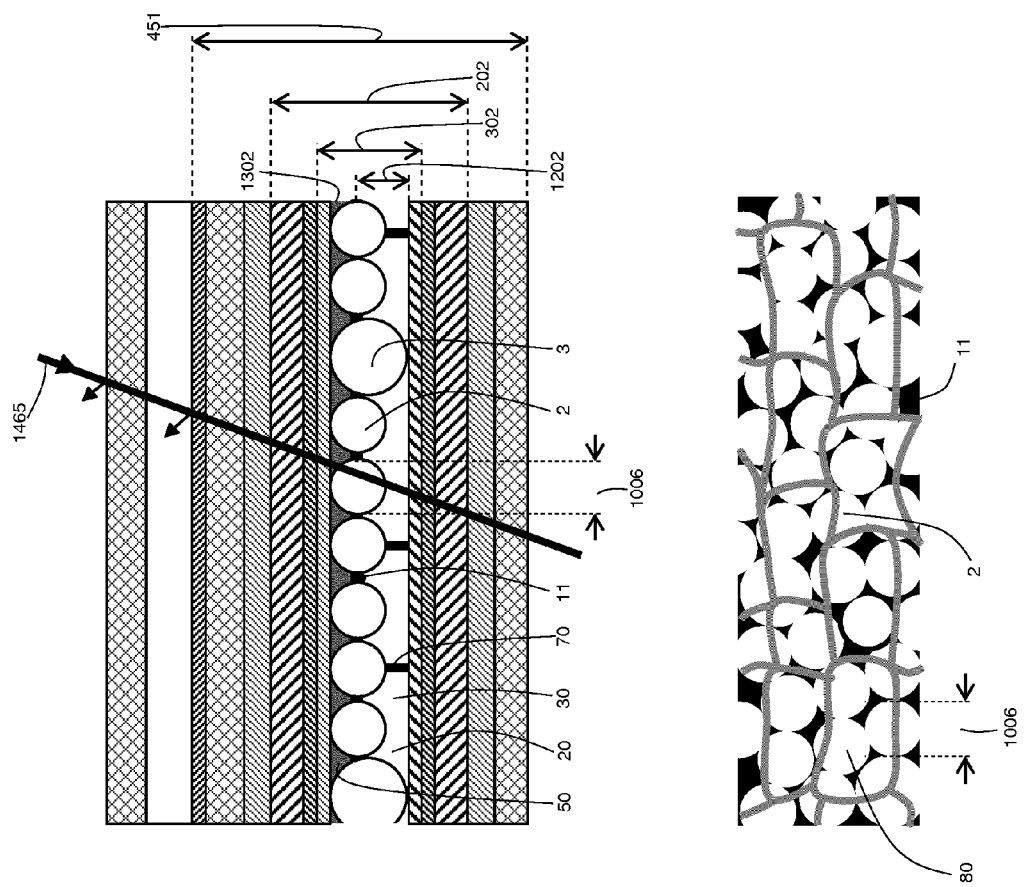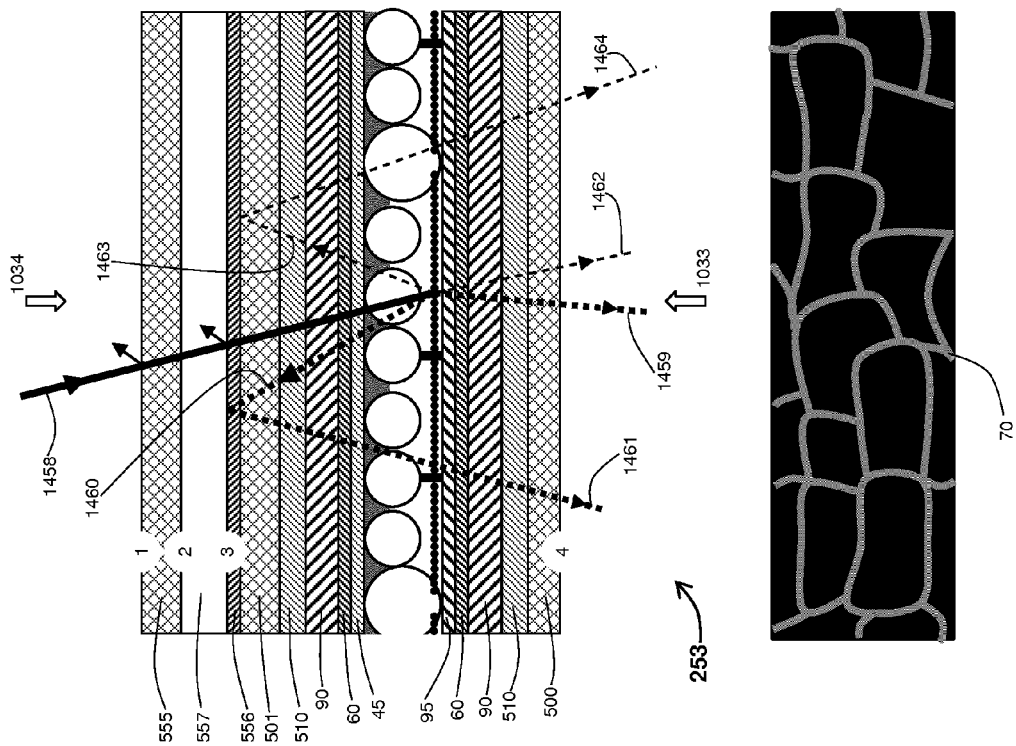
Fig. 3A
Fig. 3B

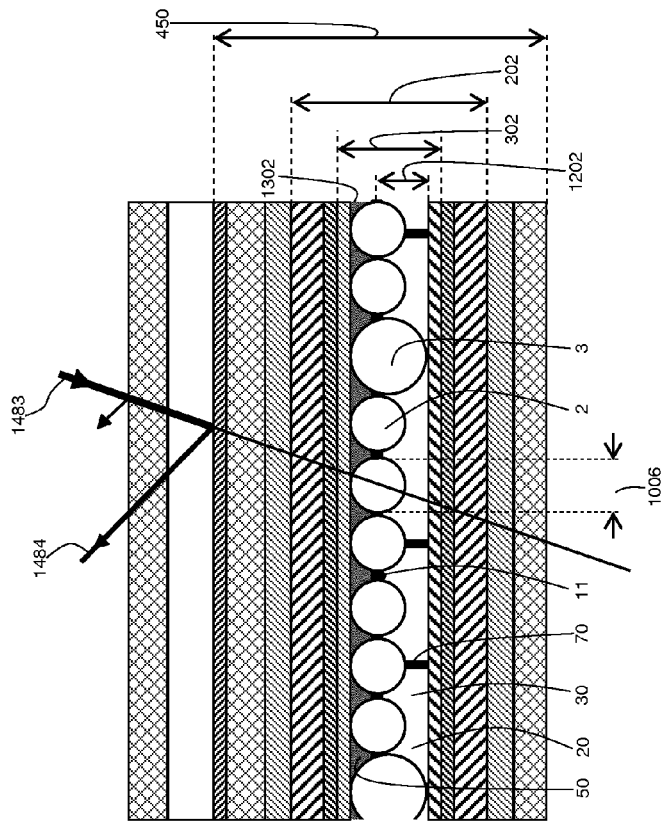
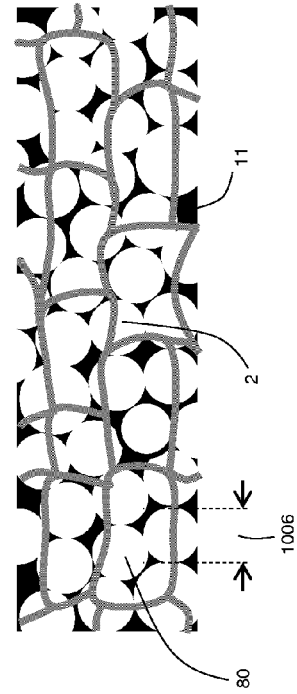
Fig. 5B
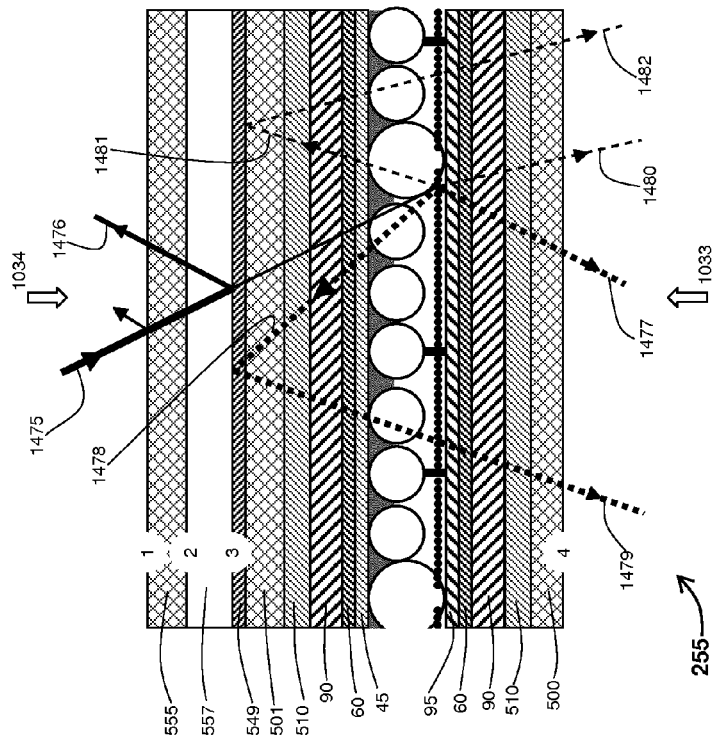
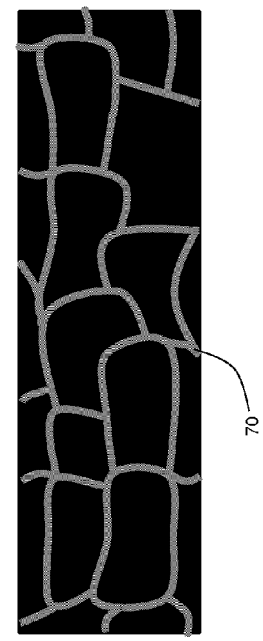
Fig. 5A

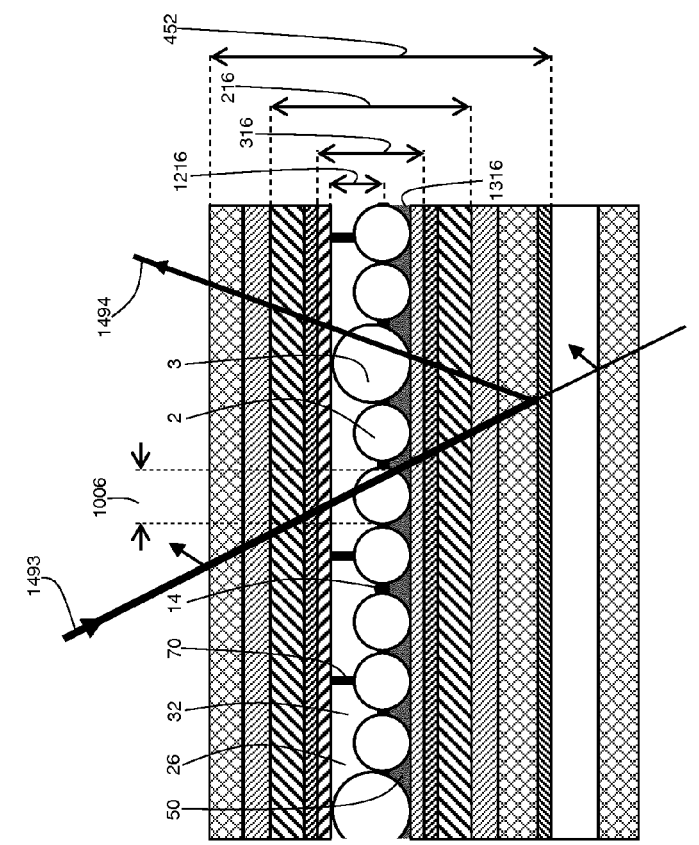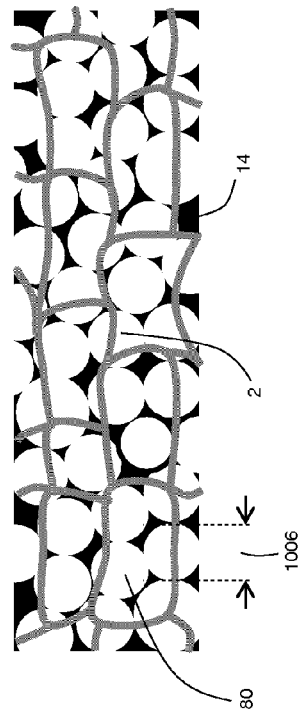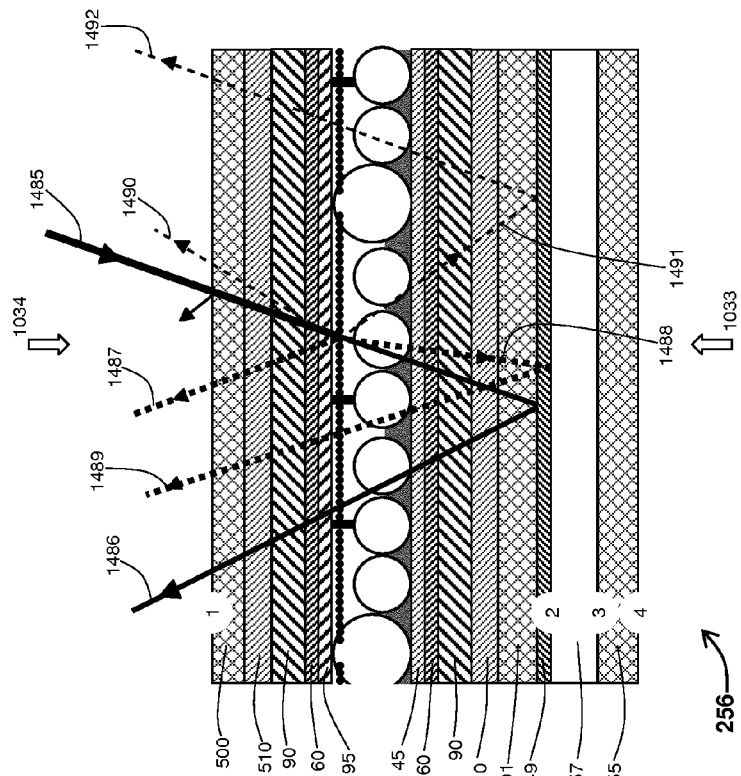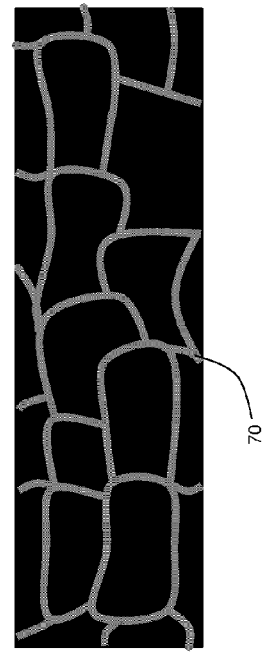
Fig. 6A
Fig. 6B

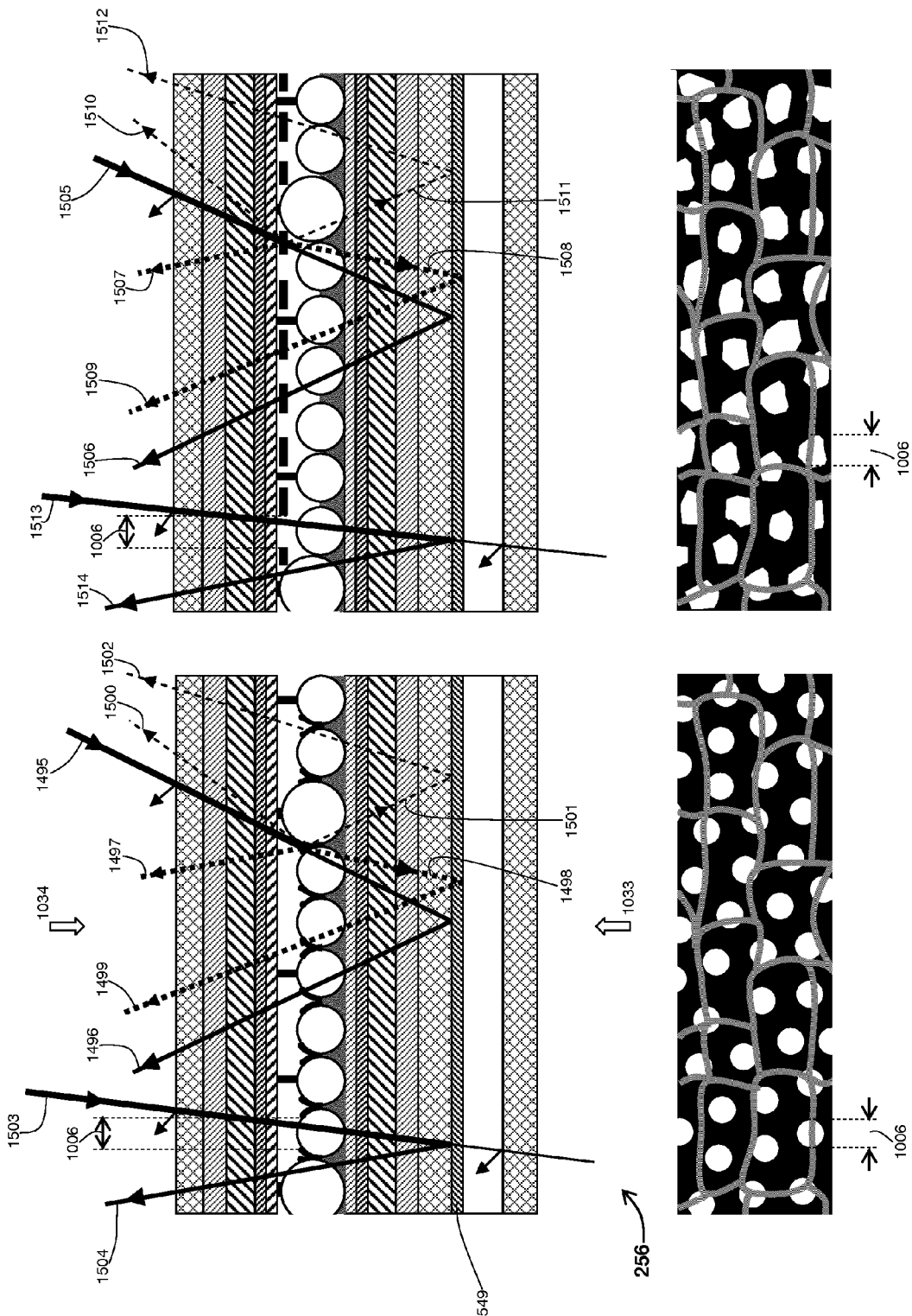

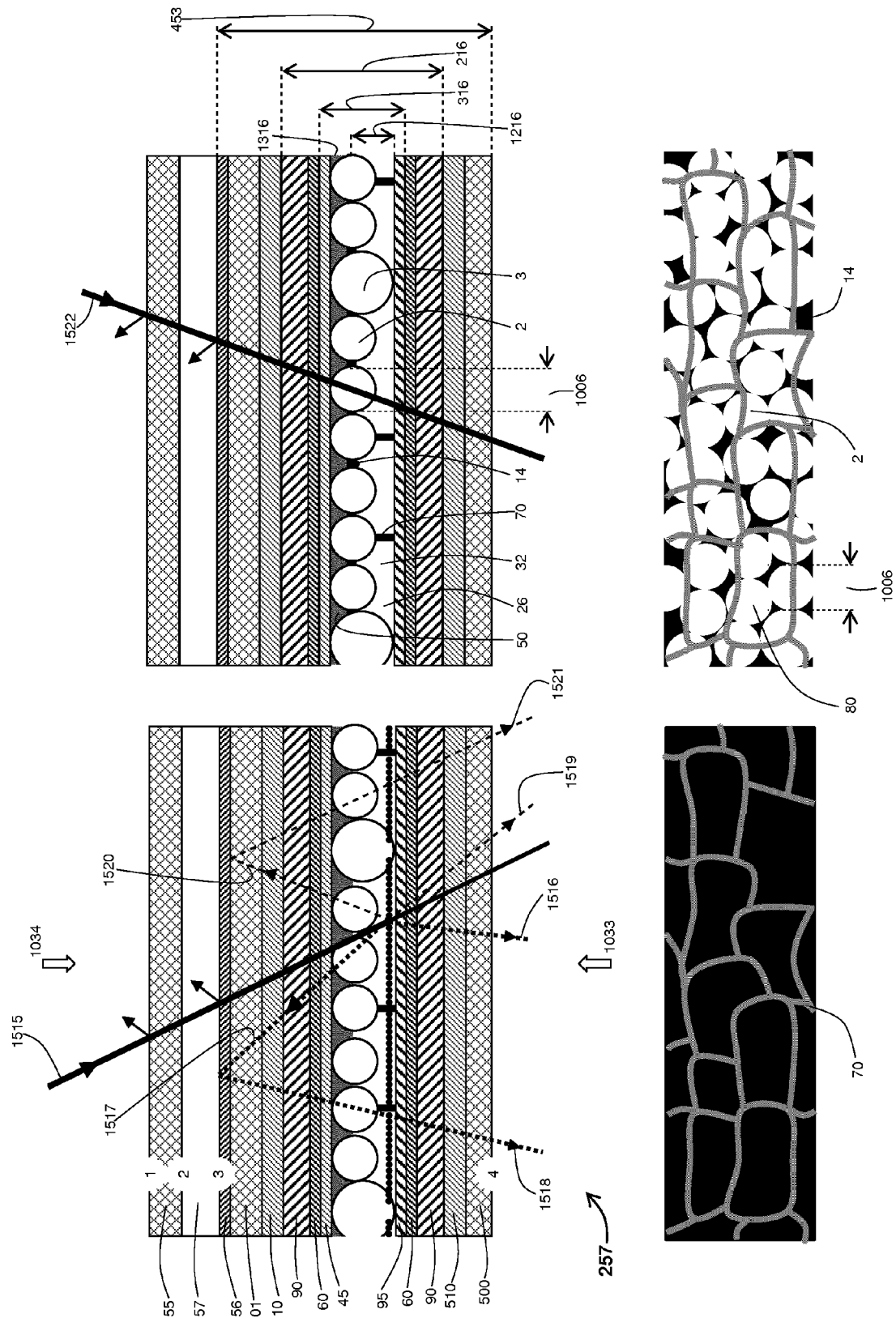

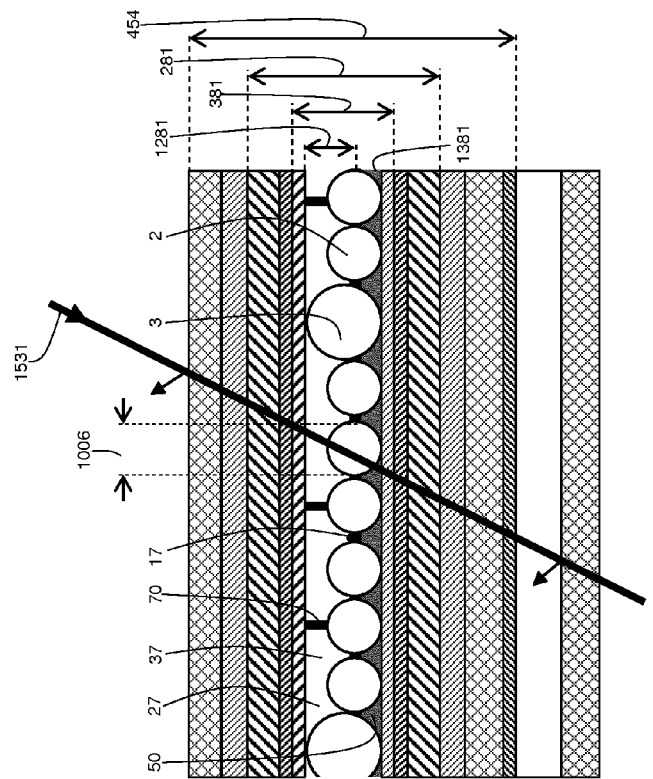
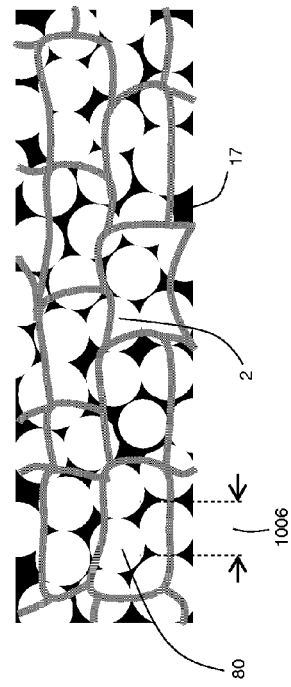
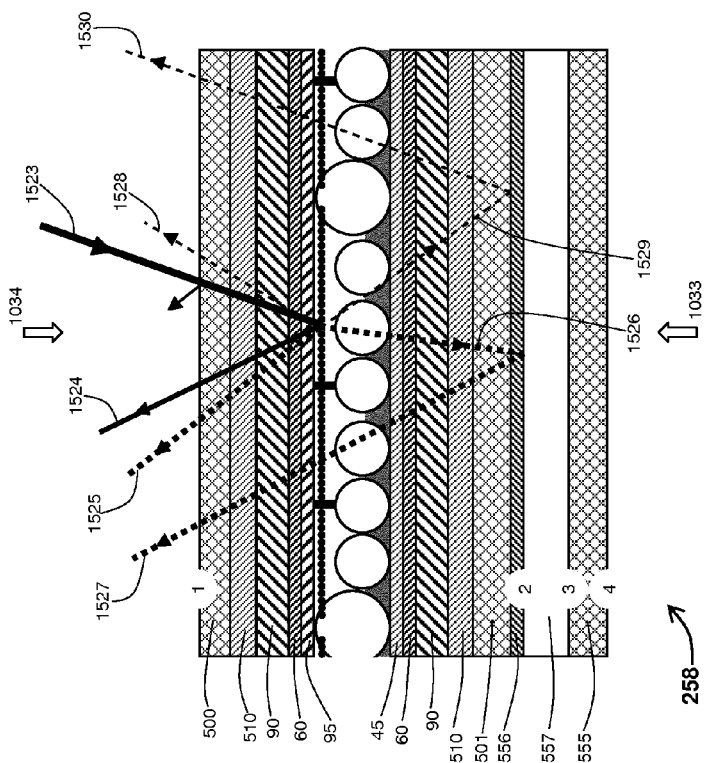
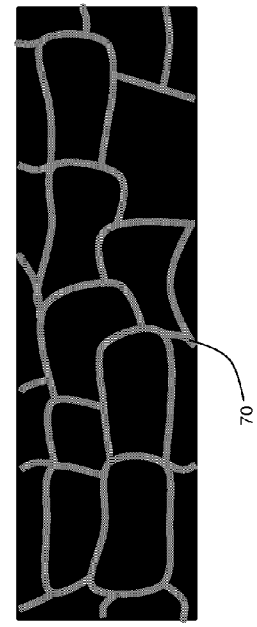
Fig. 8A
Fig. 8B

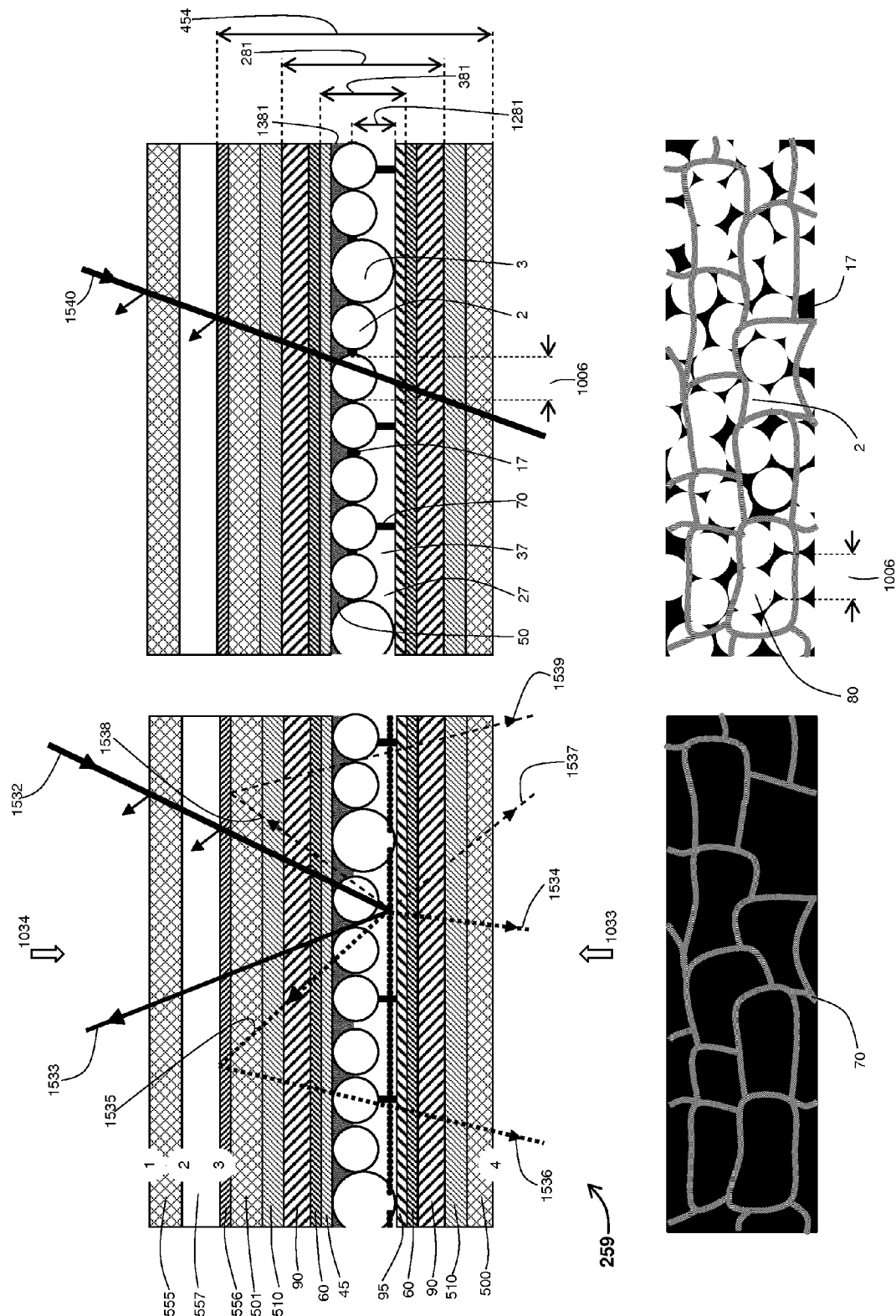

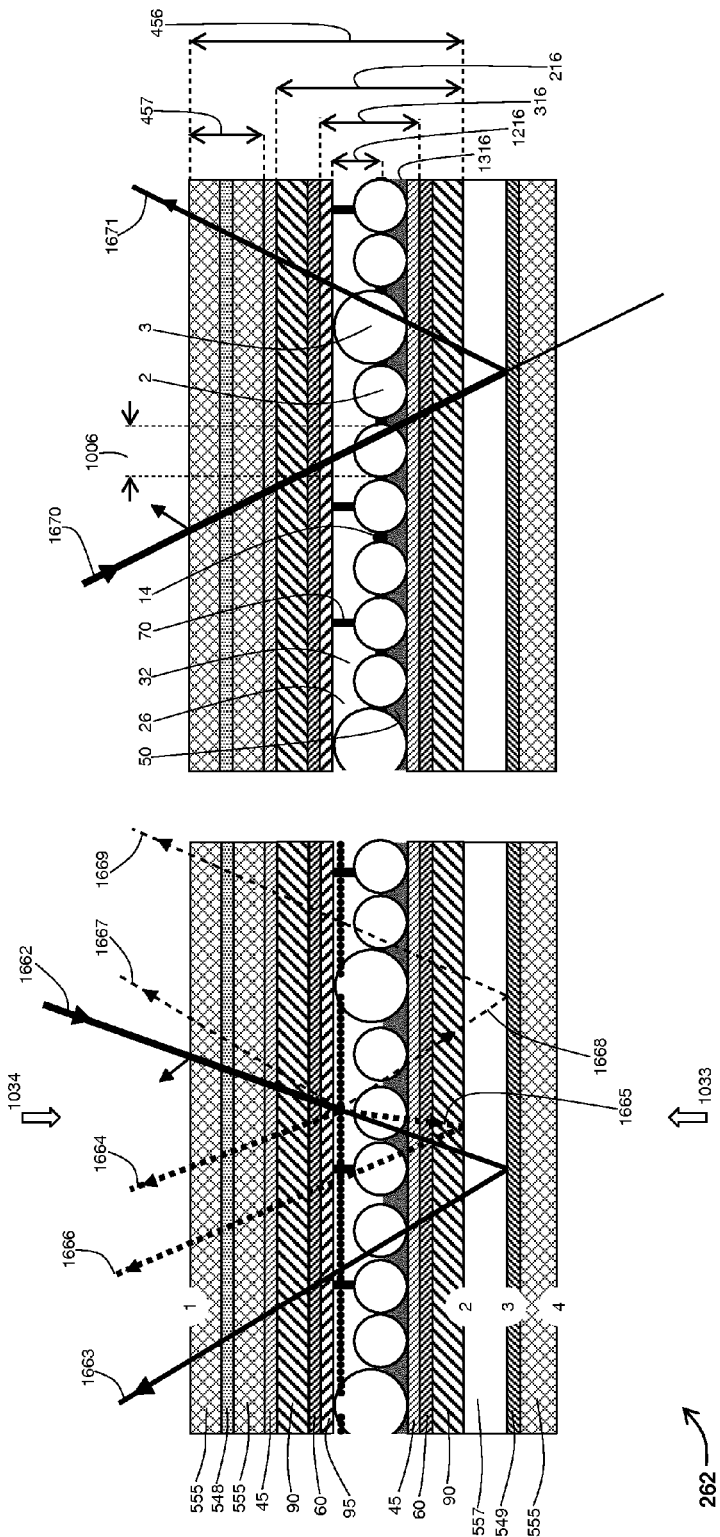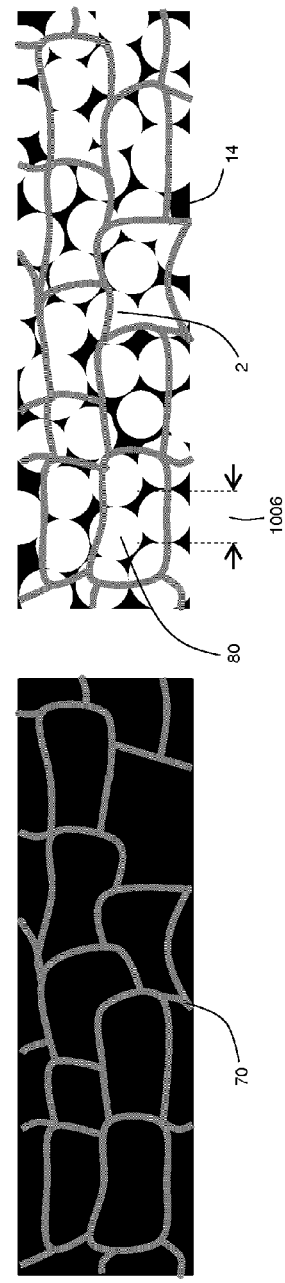
Fig. 12A
Fig. 12B ness. It has been recognized for some time
ELECTROPHORETIC INSULATED GLASS UNIT This application is a 35 USC 371 national phase filing of International Application No. PCT/EP2014/060075, filed May 16, 2014, which claims priority to Irish National Application No. S2013/0183, filed May 31, 2013, the disclosures of which are incorporated herein by reference in their entireties.

RELATED APPLICATIONS

The present application relates to Irish Patent Application No. S2013/0104 titled "An Electrophoretic Device Having a Transparent Light State" filed on 22 Mar. 2013; and co-filed Irish Patent Application No. S2013/0181 titled "Solar Control Device, Medium and Ink".

FIELD

The present invention relates to an electrophoretic solar control device that is in the form of an insulating glass unit.

BACKGROUND TO THE INVENTION

It is desirable to electronically control solar transmittance in windows to regulate solar heating and sunlight illumination. The sunlight spectrum is made up of an ultra-violet spectrum, a visible light spectrum, and a sunlight infrared spectrum. Generally it is desirable for windows to reject or filter the sunlight ultra-violet spectrum. Preferably, an electronic solution's visible-light functionality would include that provided by mechanical blinds or curtains; for example, selectable light states that include: see-through (i.e. transparent), privacy (opaque) or black-out, and reduced light transmittance. The sunlight infrared spectrum, the wavelength range from 0.78 to 2.5 microns, accounts for greater than 50% of solar energy, consequently its transmittance accounts for the majority of solar heating while contributing nothing to an inside environment's illumination. Indirectly thermal radiation (i.e. infrared typically 3 to 25 microns) from objects heated-up by sunlight in warm climates also contributes to heating of an internal environment.

Passive windows reflect thermal radiation by using a low-emissivity (i.e. low-e) coating on a glass pane in an insulating glass unit. Spectrally selective coatings are available for window panes that can reject the sunlight infrared spectrum. These coatings cannot be removed from a window when the function is not required unlike adjusting a mechanical blind. For example, it is highly desirable to reflect sunlight infrared when maintaining the temperature of an inside environment which requires cooling, but conversely, it is highly desirable to transmit sunlight infrared when maintaining the temperature of an inside environment which requires heating. It has been recognized for some time that it is desirable to have an active glass solution—a smart glass—that provides a variable range of visible light transmittance and solar transmittance.

The available smart glass solutions (also known as switchable windows) have limited functionality and inherent technological obstacles. For example, smart glass having a liquid crystal cell can be switched between a transparent state and a translucent state to provide privacy. If dichroic dye is in solution with the liquid crystal a light absorbing state can be implemented. The available solutions have liquid crystal dispersed discretely or semi continuously in a polymer matrix film and are referred to as polymer dispersed. Examples include Polymer Dispersed Liquid Crystal (PDLC), emulsion based processes often referred to as Nematic Curvilinear Aligned Phase (NCAP), and Polymer Induced Phase Separation (PIPS). A polymer dispersed liquid crystal film is laminated between glass panes to make a smart glass. In the prior art of liquid crystal, smart glass there is no adequate variable light transmittance solution, or no solution offering selective control of solar transmittance.

Suspended Particle Devices (SPD) is another prior art smart glass technology. It employs anisotropic (i.e. rod-like) dipole-particles in a suspension that align in the presence of an electrical field similar to liquid crystal molecules, and the dipole-particles do not move position or translate in a field as is the case with charged-particles in electrophoretic devices as described later. An SPD suspension is dispersed in a polymer matrix film that is subsequently laminated to glass panes. SPD smart glass provides a variable light transmittance function (dimming while maintaining transparency) but does not provide privacy (not opaque or translucent), and does not provide active control over infrared (i.e. SPD devices do not reflect infrared light). An inherent technological obstacle with SPD devices in the prior art is that their light absorptance is not neutral in the visible light range with the consequence that their dimming states appear somewhat blue and their fully darkened state appears dark blue.

There are a range of electrochromic smart glass technologies. These are not the simple light switches of other technologies; instead a reversible chemical reaction occurs when changing light states. Typically these solutions are deposited as an active layer on a glass pane, and the active layer must be provided in the sealed cavity of an insulated glass unit. Electrochromic smart glass IGUs provide some selectable control over visible and infrared light. The visible light function provided is variable light transmittance (i.e. dimming with transparency). A privacy function is not available (not opaque). Undesirably, light absorptance is not neutral for the visible light spectrum causing the variable light transmittance states to appear somewhat blue and the fully darkened state to appear dark blue.

Electrophoretic technology would seem to have the advantage of a black state but the prior art does not provide feasible solutions for smart glass. Conventional electrophoretic devices move charged particles in a suspending fluid in the direction of an electrical field. This is normally an orthogonal field from a front electrode face to a rear electrode face (i.e. vertical movement) and a transparent state is not possible. One proposal to create a transparent state in an electrophoretic device is to finely pattern one of its electrodes. This allows the charged particles to be moved laterally as well as vertically and to collect on patterned electrodes (corresponding to a subset of a display area) and having a pitch of about 200 to 300 microns. The area between patterned electrodes is then transparent and provides visual access. In some examples of display devices employing patterned electrodes just one substrate has electrodes and particles move laterally between neighbouring electrodes with one electrode group accounting for about 70% of the area. But while the fine patterning of electrodes is normal for display devices having a matrix of pixels, it is prohibitively expensive for a device intended for smart glass applications.

Other examples of electrophoretic devices that may have an inherent transparent light state capable of transmitting light and providing visual access include electrophoretic devices that use a dielectrophoretic effect to collect charged particles at a side wall of a capsule in one light state; or electrophoretic devices that use replicated microstructures (e.g., using one of the following processes: embossing, photolithography, extruding, or laser micromachining) to collect charged particles in one light state; or electrophoretic devices that use the dispersal (i.e. in a suspending fluid volume) of 10 nm to 50 nm scale, charged nanoparticles to transmit light and provide visual access in one light state; or hybrid electrophoretic devices (called electrokinetic by their inventors at Hewlett Packard) that use photolithographically created micro-pits to collect charged particles in one light state. The feasibility of these prior art electrophoretic technologies for smart glass applications is questionable due to the efficacy of their transparent light state or their complexity. For example, one proponent of replicated microstructures proposes making embossing molds on silicon. This would seem to limit such devices to small areas and discrete or batch manufacturing, and such tooling would not seem suited to the large-format, roll-to-roll manufacturing desirable for smart glass.

At ground level in hot climates the energy level in the three sunlight spectrums per square meter with the sun at its zenith is about 32 watts (3%) of UV, 445 watts (44%) of visible, and 527 watts (53%) of infrared, or about 1,004 watts total. In general, the prior art of smart glass does not describe what happens this solar energy when it is absorbed by light states, does not provide the means to manage and adapt the visible light spectrum and the sunlight infrared spectrum for a climate, and does not provide solutions that direct the energy from absorbed sunlight to substantially an outside or inside environment as required. Furthermore, the prior art of smart glass is largely silent with respect to managing the heat build-up within a device that absorbs incident solar energy.

In summary, there is a need for a solar control device that provides variable sunlight transmittance, variable solar-energy transmittance, colour-neutral visible light transmittance, the ability to direct the sunlight energy its light states absorbs to substantially an outside or inside environment as required, the ability to manage and adapt its sunlight transmission spectrum for a climate, and the ability to minimize and manage heat build-up within a device.

SUMMARY OF THE INVENTION

An electrophoretic insulated glass unit (IGU) comprises an electrophoretic laminate and a pane spaced apart from said electrophoretic laminate, the respective inner faces of said laminate and said pane defining a sealed cavity there between, and an outer face of said electrophoretic laminate being in contact with an environment, one inner face of said cavity having a coating that is transparent to visible light and which rejects infrared light greater than a cut-off wavelength;

wherein said electrophoretic laminate includes an electrophoretic device including charged particles of at least one type in an electrophoretic cell, the particles being responsive to an electric field applied to said electrophoretic device to move between: a first extreme light state in which particles are maximally spread within said cell to lie in the path of sunlight through the cell and to strongly absorb visible sunlight transmitted through the cell and a second extreme light state in which said particles are maximally concentrated within the cell to remove them from the path of sunlight through the cell and to substantially transmit visible sunlight through the cell; and said coating is arranged to direct thermal radiation emitted by said charged particles to said environment in contact with said outer face, and said sealed cavity is arranged to direct thermal conduction diffusing from said charged particles to said environment in contact with said outer face.

In embodiments said charged particles move between said first and second light states to provide at least one light state intermediate said first and second states, and said intermediate light state has a light transmittance intermediate that of said first and second light states.

In embodiments said charged particles provide said first light state with a black appearance and one or more light states intermediate said first and second light states with a black tinted appearance.

In embodiments said electrophoretic device has at least one light state that is substantially transparent to visible light to provide visual access there through.

In some embodiments said electrophoretic insulated glass unit can be used as a sunlight attenuator, a sunlight shutter, a sunlight modulator, a variable sunlight transmittance window, a variable sunlight rejection window, a variable sunlight reflectance window, or a sunlight glare-avoidance window.

In embodiments the efficiency of said coating is maximized when the coating is applied to the inner face of said electrophoretic laminate in contact with said sealed cavity, but, in alternative embodiments (that are somewhat less efficient) said coating is applied to the inner face of said pane in contact with said cavity.

In embodiments, in said first light state said charged particles absorb sunlight energy in use causing heating and heat is transmitted substantially to said environment in contact with said outer face of said electrophoretic laminate.

In embodiments in said second light state said infrared cut-off wavelength of said coating provides a shortpass filter that determines the spectrum of transmitted sunlight and is adapted for an operating climate.

In embodiments said coating has one or more metallic or semiconductor layers, and preferably is a multi-layer coating including one or more metallic or semiconducting oxide layers and one or more dielectric or optical layers.

Embodiments are configurable for either moderate-to-warm or cold climates. In moderate-to-warm climate configuration said electrophoretic laminate's outer face is in contact with an outside environment and said absorbed sunlight energy is transmitted to an outside environment to minimize solar heating of an inside environment. In cold climate configuration said electrophoretic laminate's outer face is in contact with an inside environment and said absorbed sunlight energy is transmitted to an inside environment to maximize solar heating of an inside environment.

In some embodiments said cut-off wavelength is selected to substantially transmit the sunlight infrared spectrum. In such embodiments, said coating is optimized to have an LSG of less than 1.25, and preferably 1.15 or less, and more preferably 1.10 or less. In other embodiments, said cut-off wavelength is selected to significantly reject the sunlight infrared spectrum. In these embodiments, said coating is optimized to have an LSG of 1.25 or more, and preferably 1.35 or more.

In embodiments, coatings that have an LSG of 1.15 or less can comprise a low-emissivity coating optimized using a pyrolytic process. Embodiments that have an LSG of 1.25 or more can comprise a spectrally selective coating optimized using an MSVD process. Less preferred coatings that have an LSG between 1.15 and 1.25 can also be optimized using an MSVD process.

In embodiments said coating contains one or more layers that have free electrons (i.e. they are conductors) and possess a plasma wavelength that corresponds to a cut-off wavelength for infrared light transmission.

In embodiments said rejection of the sunlight infrared spectrum by said coating includes reflection, destructive interference, and absorption.

In embodiments where said coating is a low-emissivity coating said infrared cut-off wavelength is adjacent the thermal radiation spectrum and the sunlight spectrum from visible to infrared is substantially transmitted and thermal radiation substantially reflected (i.e. rejected). Where said coating is a spectrally selective coating said infrared cut-off wavelength is adjacent the sunlight visible spectrum and the sunlight visible spectrum is substantially transmitted and the sunlight infrared and thermal radiation spectrums substantially rejected.

In embodiments the cut-off wavelength of said coating is adapted to modify the LSG of said coating. The greater the LSG ratio (over 1.25) the less solar energy transmitted to an inside environment, conversely, the lower the LSG ratio (preferably under 1.15) the more solar energy transmitted to an inside environment.

In said moderate-to-warm climate configuration said first, intermediate and second light states provide variable, solar-energy transmittance and variable, visible-sunlight transmittance: said first light state transmits near zero solar energy to an inside environment providing a maximum SHGC of 0.15 or less, and more preferably 0.12 or less, and most preferably 0.10 or less, and said second light state transmits direct solar energy only providing a minimum SHGC of at least twice, and preferably three times or more, and most preferably 3.5 times or more said first light state's SHGC; and, preferably at least half the range of said intermediate light states provide a near constant LSG ratio by increasing visible sunlight transmittance proportionally with the SHGC as said second light state is approached.

In said cold climate configuration said first, intermediate and second light states provide constant, solar-energy transmittance and variable, visible-light transmittance: said light states transmit a near constant solar energy (constant SHGC) to an inside environment independent of the light state selected, and said intermediate light states provide increasing visible sunlight transmittance with said LSG ratio increasing from near zero in a first light state to a maximum in a second light state.

In some embodiments that have a cold climate configuration said coating provides an LSG ratio of 1.25 or more, and preferably 1.35 or more, to shield said charged black particles from the heating effects of the sunlight infrared spectrum in a first light state and as a consequence to minimise the temperature rise in the outer face of said electrophoretic laminate.

In some embodiments said electrophoretic ink has charged particles that are wavelength selective deriving from the use of colourant within their core that is wavelength selective; the particles strongly absorb sunlight wavelengths shorter than a cut-off wavelength corresponding to visible sunlight and avoid (or minimize) significant absorption of sunlight wavelengths greater than the cut-off wavelength corresponding to sunlight infrared; and, particles' cut-off wavelength is within the range from 0.65 to 1.5 microns, and preferably 0.7 to 1.2 microns, and most preferably 0.75 to 1.0 microns.

In embodiments any colourant chemistry that significantly transmits or reflects the sunlight infrared spectrum, and has proven light-fastness and weather-fastness in an outdoor paint formulation, is suitable for incorporation into said wavelength-selective charged particles.

In some embodiments in said first light state, sunlight is rejected by combining strong absorption of the sunlight visible spectrum by said wavelength-selective charged particles with the rejection of the sunlight infrared spectrum by said coating optimized to provide an LSG of 1.25 or more, and in such embodiments said wavelength-selective charged particles substantially transmit the sunlight infrared spectrum.

In some embodiments in said first light state, sunlight is rejected directly by said wavelength-selective charged particles, and the sunlight visible spectrum is strongly absorbed and the sunlight infrared spectrum significantly reflected by said wavelength-selective charged particles.

In some embodiments heat build-up caused by charged particles absorbing sunlight energy is about halved by using wavelength-selective charged particles that substantially transmit or reflect the sunlight infrared spectrum (when compared to charged particles that absorb all bands).

In embodiments that have said cold climate configuration and said coating is optimized to substantially transmit the sunlight infrared spectrum (i.e. an LSG of preferably 1.15 or less), said wavelength-selective charged particles about halve the temperature rise in the outer face of said electrophoretic laminate exposed to the inside environment in a first light state (when compared to charged particles that absorb all bands).

In embodiments wavelength-selective charged particles enhance the U-value of an IGU by said reduction in heating of said electrophoretic laminate.

In embodiments that have said moderate-to-warm climate configuration said sealed cavity thermally isolates said inner pane and inner environment from possible elevated temperature operation (i.e. heating-up) of said electrophoretic laminate in strong sunlight.

In embodiments said heat in said first light state is dissipated from said outer face by thermal radiation and convection, and said heat dissipates from said charged particles to said outer face by thermal conduction and thermal radiation, to minimize temperature build-up within layers between said charged particles and said outer face the thermal conductance of each layer is maximized and the thickness of each layer is minimized.

To maximize thermal conductance in embodiments the different polymer materials in layers have a thermal conductivity of 0.1 W/(m·K) or more, and preferably of 0.15 W/(m·K) or more, and more preferably of 0.2 W/(m·K) or more, and the thickness of said electrophoretic device's substrate is 200 micron or less, more preferably 175 micron or less, and most preferably 125 micron or less, and the thickness of an interlayer is 0.8 mm or less, more preferably 0.5 mm or less, and most preferably 0.38 mm or less (a preferred interlayer is the Sekisui S-LEC EN in 0.25 mm thickness), and the thickness of the outer pane (providing said outer face) is preferably 6 mm or less, more preferably 4 mm or less, and most preferably 2.6 mm or less.

This requirement to maximize heat flow in an element of a window runs contrary to the prior art of window design where heat flow (i.e. thermal transmittance) is expressed by a U-value (or its reciprocal R-value) and is minimized for each element.

In some electrophoretic laminates a high thermal conductivity polymer sheet can replace a glass pane in contact with an environment when its thermal conductivity is similar to glass and preferably has a thermal conductivity of 0.5 W/(m·K) or more, and most preferably 0.75 W/(m·K) or more.

In embodiments, the materials in said electrophoretic cell substantially transmit thermal radiation thereby resulting in an immediate heat flow (i.e. the energy in the transmitted thermal radiation) from said charged black particles to layers outside said electrophoretic cell. In some embodiments said electrodes partially or substantially transmit thermal radiation.

In embodiments said electrophoretic device comprises said electrophoretic cell sandwiched between (and bonded to) a pair of transparent electrodes coated onto a pair of substrates, and said electrophoretic cell comprises an electrophoretic ink comprising said charged particles suspended in a suspending fluid, and preferably said substrates are film substrates and said electrophoretic device is an electrophoretic film device.

In some embodiments said electrophoretic laminate comprises said electrophoretic device assembled between a pair of adhesive layers (e.g. EVA interlayers) and a pair of glass panes, and each adhesive layer covers substantially the full surface of each pane and bonds an opposing face of said electrophoretic device to a face of a pane, and the electrophoretic laminate is a monolith.

In alternative embodiments said electrophoretic laminate comprises said electrophoretic film device applied to a rigid pane using an adhesive layer, and said electrophoretic film device is in contact with said sealed cavity; and, preferably said adhesive is a pressure sensitive adhesive.

In yet other alternative embodiments said electrophoretic laminate comprises said electrophoretic film device applied to a glass laminate using an adhesive layer, and said electrophoretic film device is in contact with said sealed cavity; said glass laminate provides industry specified safety standards or enhanced performance such as mechanical, protection, sound insulation, or decoration, and said electrophoretic film device provides variable light states; and, preferably said glass laminate comprises a pair of glass panes optically bonded to each other using a PVB interlayer and an autoclave process.

In some embodiments said panes of said electrophoretic laminate are glass and treated to make them more resilient to thermal shock using one of the following processes: heat strengthening, chemical toughening, or thermal toughening.

In some embodiments a risk of spontaneous breakage of glass panes due to thermal stress can be greatly reduced or eliminated by subjecting panes that are one of heat-strengthened, chemically-toughened, or thermally-toughened, to a heat soak test or treatment that through a process of elimination identifies good panes for use as panes in said electrophoretic laminate.

In an IGU embodiment for use in a transport vehicle the thickness between the two outer faces (i.e., surfaces number 1 and 4) is minimized to be 12 mm or less, and preferably, 7.5 mm or less, and most preferably 5.6 mm or less, by using a vacuum in said sealed cavity and said vacuum cavity has a near zero thickness (preferably 1 mm or less, and more preferably 0.5 mm or less, and most preferably about 0.2 mm), and furthermore, the thickness is minimized by using panes that have a minimum thickness, preferably 3 mm or less, and optionally using a polymer material for one or more panes in said IGU.

In some embodiments configured for a moderate-to-warm climate an additional low-emissivity coating is provided on either said inner (3) or outer face (4) of said pane to maximize an IGU's U-value by reflecting thermal radiation from an inner environment.

In use, some embodiments are mounted in a frame that defines an opening and function as an electro-active window.

In embodiments said electrophoretic cell comprises said electrophoretic ink distributed in discrete or semi-discrete volumes and comprising said charged particles suspended in a suspending fluid, and the refractive index of the suspending fluid and polymer elements (other than charged particles) in the electrophoretic cell are matched to have negligible haze in said second light state.

In some embodiments said volumes of said electrophoretic ink form a monolayer adjacent one of said electrodes on one side and are adjacent a non-planar polymer structure comprising a monolayer of close packed protrusions (i.e. polymer balls) on the opposite side, and the protrusions project into the volumes, and said charged particles move over (i.e. are deflected by) a protrusion's surface projecting into said volume in response to an applied electrical field to concentrate in the space between protrusions in said second light state.

BRIEF DESCRIPTION OF THE DRAWINGS

Embodiments of the invention will now be described, by way of example, with reference to the accompanying drawings, in which:

FIG. 1 shows an embodiment 251 of an electrophoretic insulated glass unit configured for a moderate-to-warm climate. It is a double-glaze embodiment and shows optional integrated functions.

FIG. 2A shows an embodiment 252 of an electrophoretic insulated glass unit configured for a moderate-to-warm climate in a first light state. Its electrophoretic ink has charged particles that absorb the entire sunlight spectrum, and it has a low-emissivity coating on its number 2 surface.

FIG. 2B shows embodiment 252 in a second light state.

FIG. 3A shows an embodiment 253 of an electrophoretic insulated glass unit configured for a cold climate in a first light state. Its electrophoretic ink has charged particles that absorb the entire sunlight spectrum, and it has a low-emissivity coating on its number 3 surface.

FIG. 3B shows embodiment 253 in a second light state.

FIG. 5A shows embodiment 255 in a first light state and is similar to FIG. 3A except embodiment 255 has a spectrally selective coating on its number 3 surface.

FIG. 5B shows embodiment 255 in a second light state.

FIG. 6A shows an embodiment 256 of an electrophoretic insulated glass unit configured for a moderate-to-warm climate in a first light state. Its electrophoretic ink has charged particles that transmit the sunlight infrared spectrum, and it has a spectrally selective coating on its number 2 surface.

FIG. 6B shows embodiment 256 in a second light state.

FIG. 6C shows embodiment 256 in an intermediate light state of a first set of intermediate light states.

FIG. 6D shows embodiment 256 in an intermediate light state of a second set of intermediate light states.

FIG. 7A shows an embodiment 257 of an electrophoretic insulated glass unit configured for a cold climate in a first light state. Its electrophoretic ink has charged particles that transmit the sunlight infrared spectrum, and it has a low-emissivity coating on its number 3 surface.

FIG. 7B shows embodiment 257 in a second light state.

FIG. 8A shows an embodiment 258 of an electrophoretic insulated glass unit configured for a moderate-to-warm climate in a first light state. Its electrophoretic ink has charged particles that reflect the sunlight infrared spectrum, and it has a low-emissivity coating on its number 2 surface.

FIG. 8B shows embodiment 258 in a second light state.

FIG. 9A shows an embodiment 259 of an electrophoretic insulated glass unit configured for a cold climate in a first light state. Its electrophoretic ink has charged particles that reflect the sunlight infrared spectrum, and it has a low-emissivity coating on its number 3 surface.

FIG. 9B shows embodiment 259 in a second light state.

FIG. 10 shows an embodiment 260 of an electrophoretic insulated glass unit that has a vacuum cavity. It is shown in use as an electrophoretic roof system for a vehicle.

FIG. 12A shows embodiment 262 in a first light state and is similar to FIG. 11A except embodiment 262's electrophoretic glass laminate comprises an electrophoretic film laminated to a prior-assembled glass laminate.

FIG. 12B shows embodiment 262 in a second light state.

DETAILED DESCRIPTION

Figures 4A, 4B:
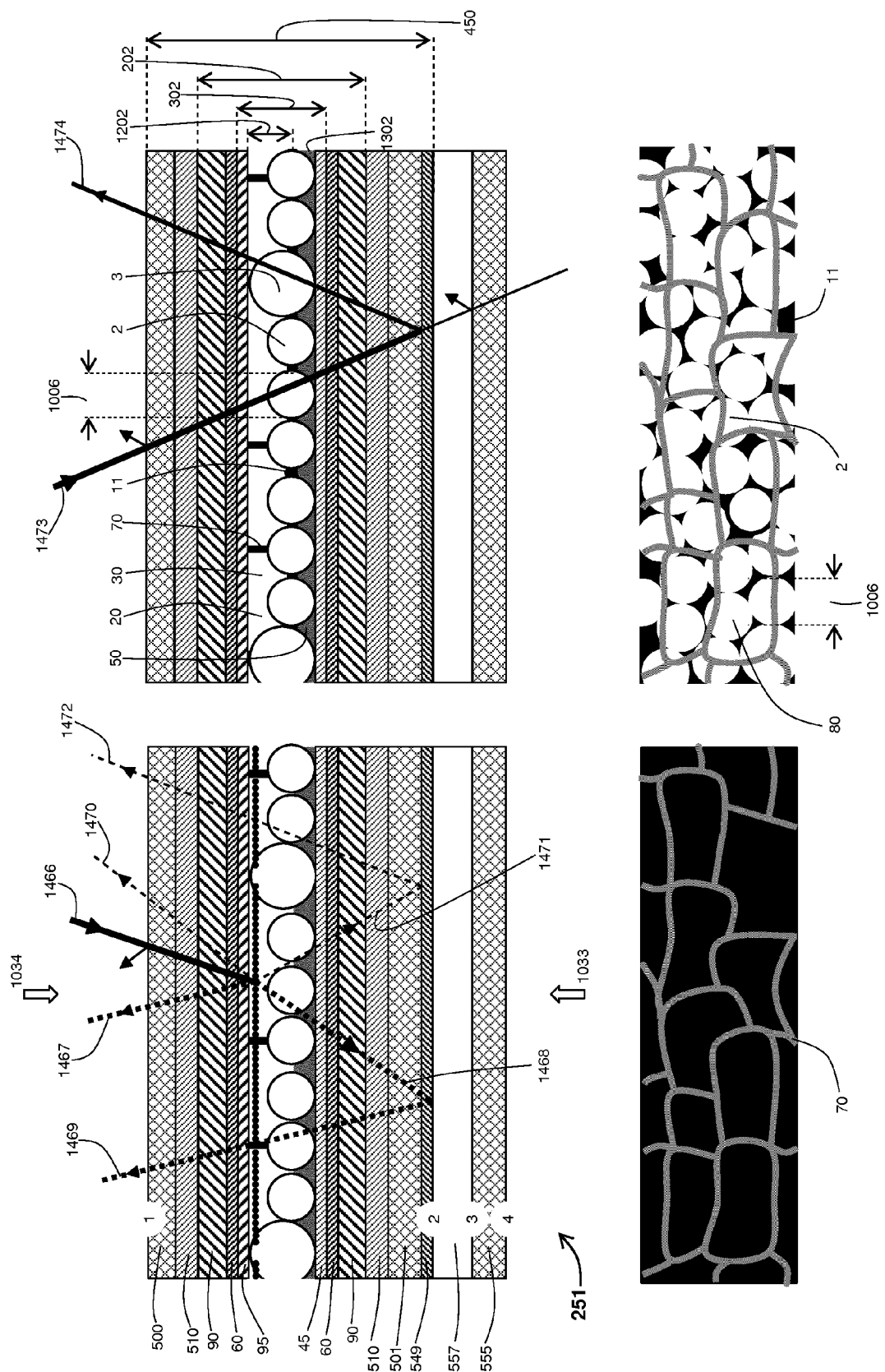
FIG. 4A shows embodiment 251 (also shown in FIG. 1) in a first light state and is similar to FIG. 2A except embodiment 251 has a spectrally selective coating on its number 2 surface.
FIG. 4B shows embodiment 251 in a second light state.

There is a problem with variable, light transmittance devices (i.e. smart glass) in dealing with the energy in absorbed sunlight. This absorbed energy causes heat build-up within a device. A single-glaze, smart glass window device incorporating a variable light transmittance film cannot direct this heat (from sunlight absorbed by its electro-optical cell) to substantially an outside or inside environment. In such devices the heat caused by absorbed sunlight thermally radiates and convects from both faces of the device. The fraction of thermal radiation from each face is in proportion to the temperature difference between a face and air in the contacting environment, and the fraction of convection from each face is also in proportion to the temperature difference as well as the air velocity in the contacting environment. Such devices offer poor control of solar energy because it is the respective temperature differences that determine how the heat caused by absorbed sunlight (i.e. solar energy) is distributed between an inside and outside environment.

The present invention provides insulating glass unit (IGU) embodiments that actively manage solar energy and direct sunlight energy absorbed by its light states to an outside environment in warm climates to minimize cooling costs, or to an inside environment in cold climates to minimize heating costs.

FIGS. 1 to 12B show embodiments and demonstrate the method of the current invention. Electrophoretic insulating glass unit (IGU) embodiments comprise an electrophoretic laminate and a second pane spaced apart from the electrophoretic laminate with the respective inner faces of both defining a sealed cavity. The outer face of the electrophoretic laminate is in contact with an environment. One of the inner faces in contact with the sealed cavity (i.e. a face of the cavity) has a coating that is transparent to visible light and rejects infrared light greater than a cut-off wavelength. The coating provides a shortpass filter that determines the spectrum of transmitted light and it can be adapted to an operating climate. The electrophoretic laminate is an assembly of one or two glass panes and an electrophoretic film device. The latter has charged particles, preferably black, and preferably having the same polarity (i.e. the same type) in its electrophoretic cell.

The electrophoretic cell has at least one light state transparent to visible light to provide visual access. The charged particles respond to an electric field applied to the electrophoretic device to move between light states. In a first extreme light state the particles are maximally spread within the cell to lie in the path of sunlight through the cell and to strongly absorb visible sunlight transmitted through the cell. In a second extreme light state the particles are maximally concentrated within the cell to remove them from the path of sunlight through the cell and to substantially transmit visible sunlight through the cell. In intermediate light states the particles move to variable positions between the first and second light states to partially absorb visible sunlight and provide a variable black tinted appearance. The infrared-light-rejecting coating is arranged within an IGU embodiment to direct thermal radiation emitted by the charged particles (in response to absorbing sunlight energy) to the environment in contact with the outer face of the electrophoretic laminate, and the sealed cavity is arranged to direct thermal conduction diffusing from the charged particles (in response to absorbing sunlight energy) similarly to the environment in contact with the outer face.

Electrophoretic, insulated glass unit (IGU) embodiments can be used in applications including as a sunlight attenuator, a sunlight shutter, a sunlight modulator, a variable sunlight transmittance window, a variable sunlight rejection window, a variable sunlight reflectance window, or a sunlight glare-avoidance window.

FIG. 1 shows the elements of a double-glaze IGU embodiment 251: electrophoretic glass laminate 450 forms the outer pane and its face number 1 is in contact with outside environment 1034; pane 555 is the inner pane; sealed gas cavity 557 fills the volume between laminate 450 and pane 555; and, IGU face number 2 (in contact with sealed cavity 557) has a coating 549 that is transparent to visible light and rejects infrared light greater than a cut-off wavelength.

The electrophoretic films and electrophoretic cells shown in FIGS. 1 to 12B have an inherent transparent light state and the devices, methods of construction, and methods of operating are described in the related Irish Patent Application No. S2013/0104 titled "An Electrophoretic Device Having a Transparent Light State". It will be appreciated that any electrophoretic cell that has one or more transparent light states can equally be used as a substitute for the electrophoretic cells herein once the methods described herein are applied. The electrophoretic films are described later in relation to FIG. 2A.

In FIG. 1 IGU embodiment 251 is configured for a moderate-to-warm climate by arranging a face of electrophoretic glass laminate 450 to be in contact with an outside environment 1034. This means that the electrophoretic laminate must be the outer most pane in the IGU and in such an embodiment sunlight energy absorbed by the electrophoretic laminate is substantially directed to an outside environment. As shown in subsequent embodiments, in a cold climate configuration a face of an electrophoretic glass laminate is in contact with an inside environment 1033 (e.g., see FIG. 3A) and the electrophoretic laminate is the inner most pane of the IGU and sunlight energy absorbed by the electrophoretic laminate is substantially directed to the inside environment.

A particular advantage of embodiments having the moderate-to-warm climate configuration is that when strong sunlight is incident on an embodiment the sealed cavity thermally isolates the inner pane and the temperature of the inner pane remains close to the air temperature of the inner environment (i.e. the inner pane does not heat-up appreciably) even if an embodiment's outer pane has a significantly elevated temperature as can be the case if charged black particles absorb the sunlight infrared spectrum of incident sunlight. But as described later, some embodiments do not heat-up appreciably in their light states when exposed to strong sunlight.

Electrophoretic glass laminate 450 comprises an electrophoretic film device 202 (described later in relation to FIG. 2A) assembled between a pair of optically-clear adhesive layers 510 (known as interlayers) and a pair of glass panes 500 and 501. Each adhesive layer 510 covers substantially the full surface of each pane and bonds an opposing face of the electrophoretic film 202 to a face of a pane. The resulting electrophoretic laminate is a monolith.

The glass panes (i.e. 500, 501 and 555) can be one of the following: clear float glass, tinted/coloured glass, self-cleaning glass (e.g., Pilkington Activ), low-reflectivity glass (e.g., Pilkington Optiview), high-grade thin glass (e.g., Pilkington Microfloat), or a high optical purity glass (e.g., Pilkington Optiwhite). A pane is synonymous with a lite. In some embodiments an outer pane 500 can be one type such as self-cleaning glass and an inner pane 501 another type such as high-quality clear glass. The outside environment is indicated by 1034 and the inside environment by 1033. Film 202 can have the orientation shown with respect to an outside environment or the reverse orientation.

An interlayer 510 can be polyvinyl butyral (PVB), ethylene-vinyl acetate (EVA) or polyurethane (PU), and advantageously incorporates a UV filtering function that absorbs 99% or more of incident UV light to shield the electrophoretic cell from UV induced degradation. Preferably, an EVA interlayer is used as these have the lowest maximum processing temperature and very good adhesion to PET substrates. A vacuum-bag glass laminating process is preferred over an autoclave. Suitable interlayer films for use in the present invention include EVASAFE from Bridgestone Corporation, Japan, and S-LEC EN from Sekisui, Japan. Process guidelines for laminating PET films to glass are available from both suppliers.

On opposing electrodes 60 of electrophoretic film 202 connection ledges are prepared: a power or signal lead 522 is soldered to a copper tape 521 or other highly conductive flexible material that in turn is bonded to the conductive electrode surface 60 via a conductive adhesive or conductive ink 520. The four edges of the glass laminate are sealed with suitable sealant 523. A gas cavity 557 is sealed by spacers 558. The cavity's gas is typically argon, krypton, or dehydrated air. As described later in relation to FIG. 10 a sealed cavity in an IGU embodiment can also be a vacuum.

Additional functional layers can be incorporated into an IGU embodiment as shown in FIG. 1. A user interface 586 overlaps part of the IGU 251's surface number 4. For example, user interface 586 can be a transparent touch screen and preferably it is secured to surface number 4 using a pressure sensitive adhesive. User interface 586 allows a user change light states of embodiment 251 by touching its glass surface. Photovoltaic cell 551 harvests energy from the sun and can be opaque or transparent to visible light. It is shown applied (using a pressure sensitive adhesive) to IGU 251's surface number 1. It can be used to power an IGU embodiment, or if the photovoltaic cell were transparent to visible light it could cover the face of a window and contribute to the energy needs of a building or vehicle. Other optional functional layers include lighting elements (e.g., an electroluminescent sheet or LEDs), or a transparent heater (i.e. a metallic coating with bus bars for electrical connection) to heat an electrophoretic cell in extreme cold operating conditions.

In use IGU 251 can be mounted in a frame that defines an opening and functions as an electro-active window as described in following embodiments. In the IGU embodiment figures that follow the edge area elements shown in FIG. 1 including the connecting ledge elements (520 to 522), the edge seal 523, and the cavity seal 558, are usually not shown.

In many of the figures that follow embodiments are shown in two views: one view shows a cross section, and the other view is of a face of an embodiment and can be a front or rear face unless otherwise indicated. Cross sectional views represent a diagonal cross section of the face view unless otherwise indicated. In addition, a figure having a letter denominator represents an embodiment in a specific light state and each letter denominated figure (for a given number) is of the same embodiment, just different light states. For example, FIGS. 6A to 6D are of the same embodiment 256 in different light states. IGU embodiments have their faces numbered as shown in FIG. 1 by assigning face number 1 to the planar surface exposed to the outside environment 1034, face number 2 to the planar surface exposed to sealed cavity 557 and closest to the outside environment, face number 3 to the opposite planar surface exposed to the sealed cavity 557, and face number 4 to the planar surface exposed to the inside environment 1033.

In FIGS. 2A to 5B an electrophoretic film 202 is shown that has an electrophoretic ink 30 in an electrophoretic cell 302. The latter is indicated by an arrow in FIG. 2B and includes all of the elements sandwiched between top and bottom electrodes 60. Ink 30 has black negatively charged particles 11 in a transparent, isotropic suspending fluid 20. Charged particles 11 have the ability to absorb the entire sunlight spectrum (UV, visible and infrared), suitable particles are described in the prior art of electrophoretic displays and include those having a core containing carbon black or copper chromite. To minimize and avoid haze in a second light state the refractive index of transparent polymer elements within electrophoretic cell 302 (including polymer walls 70, space-filling polymer 50, and polymer balls 2 and 3) are matched (e.g., within 0.002 of each other) to the suspending fluid 20.

FIG. 2A shows electrophoretic film 202 in the first light state and represents a maximum spreading or distribution of charged particles in a plane adjacent the top electrode 60. Negatively charged black particles 11 move within suspending fluid 20 in response to an electrical field until they are near uniformly spread planar with the top electrode 60 and lie in the path of sunlight through the cell 302. The electrical field is applied between electrodes 60 by a controller (not shown) that establishes a positive potential (in the case of negatively charged particles 11) between the top (i.e. adjacent insulating layer 95) and bottom (i.e. adjacent optical clear adhesive 45) electrodes 60. A suitable controller and signals for operating electrophoretic film 202 are described in the related Irish Patent Application No. S2013/0104 titled "An Electrophoretic Device Having a Transparent Light State". In the first light state charged particles 11 cover a face of an electrophoretic film 202, incident sunlight is strongly absorbed by particles 11, and film 202 appears uniformly black.

FIG. 2B shows electrophoretic film 202 in the second light state and represents a maximum concentrating of charged particles 11 upon the surface of non-planar structure 1302. Negatively charged black particles 11 move within suspending fluid 20 in response to an electrical field until they are concentrated in the space between polymer balls 2 and 3 (i.e. the volume defined by the surfaces there between) to remove them from the path of sunlight through cell 302. The electrical field is applied between electrodes 60 and establishes a negative potential (in the case of negatively charged particles 11) between the top and bottom electrodes 60. Each polymer ball 2 or 3 defines an aperture 1006 that is substantially free of particles 11, is transparent to sunlight, and provides visual access to objects lying in view behind electrophoretic film 202. Sunlight in the visible and infrared spectrums incident on electrophoretic cell 302 is transmitted through an aperture 1006 defined by a polymer ball 2 and exits the cell 302 substantially free of attenuation or light scattering.

Polymer balls 2 are near monodisperse microspheres or protrusions and account for >90% of balls, and polymer balls 3 are monodisperse and act as cell-gap spacers by establishing the thickness of the cell 302. Polymer balls 3 also ensure that electrophoretic ink 30 is free to surround or engulf polymer balls 2 in the electrophoretic ink layer 1202 and that particles 11 can spread over polymer balls 2 unobstructed in the first light state. Polymer balls 2 and 3 project into the electrophoretic ink 30's volume and partially fill electrophoretic layer 1202 that otherwise indicates the volume filled with electrophoretic ink 30. The polymer structure 1302 indicates a non-planar structure optionally bonded to an optical-clear-adhesive (OCA) 45 and adjacent the bottom electrode 60 within cell 302. It comprises polymer 50 and polymer balls 2 and 3. Polymer 50 fills the space between polymer balls 2 and 3 approximately up to an equator plane. In electrophoretic film 202 polymer balls 2 and 3 are arranged tightly in a monolayer and are described as having close packing. The face view of FIG. 2B shows polymer balls 2 having random close packing.

In embodiments the substrates 90 can be flexible or rigid. Any suitable transparent polymer sheet material such as PET (i.e. polyethylene terephthalate), PEN (i.e. polyethylene napthalate), PES (i.e. polyether sulfone), PC (i.e. polycarbonate), PI (i.e. polyimide), or FRP (i.e. fiber reinforced plastic) can be used for flexible substrates. Furthermore, thin flexible glass with a thickness of 30 to 150 microns can also be used for substrates 90 such as available from Nippon Electric Glass Co. Ltd in 50 microns or 100 microns roll formats.

Preferably embodiments have film substrates and are flexible and capable of conforming to a curvature (i.e. roll) having a diameter of 300 mm or more, and preferably 150 mm or more. Unless otherwise described the electrodes 60 are any suitable transparent conductor. For example, ITO (i.e. indium tin oxide), FTO (i.e. fluorine tin oxide), IZO (i.e. indium zinc oxide), carbon nanotubes, silver nanowires, or a conductive polymer such as PEDOT (i.e. poly(ethylenedioxythiophene). Silver nanowires or PEDOT can be printed or coated as a conductive ink onto a substrate. A top electrode 60 can be one type such as ITO and a bottom electrode 60 another type such as silver nanowires. Colour-neutral, transparent electrodes are preferred for embodiments that require high optical quality. For example, the Flexvue range of anti-reflection, ITO electrodes from Solutia, or silver nanowires.

Insulating layer 95 is optional and is used to prevent electrical contact between an electrophoretic ink 30 and an electrode 60. But, depending on how the walls 70 of cavities 80 are formed the cavity forming process can form a thin polymer wall 70 adjacent top electrode 60 making insulating layer 95 redundant.

Polymer walls 70 define cavities 80 (see FIG. 2B) that divides electrophoretic ink 30 into discrete or semi discrete volumes or regions within electrophoretic cell 302. The cross sectional views show walls 70 as predominantly vertical and extending from the surface of polymer balls 2 and 3 to top electrode 60. The polymer walls 70 can be formed by a polymer induced phase separation process (known as PIPS in the prior art).

Embodiment 252 is an electrophoretic insulated glass unit configured for a moderate-to-warm climate. One face of electrophoretic laminate 451 forms face number 1 of IGU 252 and is in contact with an outside environment 1034. The other face of 451 forms face number 2 and has a low-emissivity coating 556. The latter is in contact with sealed gas cavity 557 defined by the volume between face number 2 and face number 3 of IGU 252. Glass pane 555 is in contact with an inside environment 1033. In embodiments a low-emissivity coating 556 is transparent to visible light, substantially transparent to sunlight infrared less than its cut-off wavelength, and reflects longwave infrared (i.e. thermal radiation) greater than its cut-off wavelength.

In FIG. 2A sunlight ray 1450 is absorbed by charged particles 11 in a first light state and the solar energy in its UV, visible and infrared spectrums is directed (i.e. returned) to an outside environment 1034. The progress of incident ray 1450 through IGU 252 is as follows; the air to glass interface of face number 1 reflects a part of ray 1450; an interlayer 510 in electrophoretic glass laminate 451 absorbs 99% or more of the UV spectrum of ray 1450; a first light state of electrophoretic glass laminate 451 absorbs the visible and sunlight infrared spectrums of ray 1450 using the black charged particles 11 of its electrophoretic ink 30; the absorbed energy of sunlight ray 1450 is partly conducted from particles 11 and partly emitted as thermal radiation from particles 11 in all directions (i.e. diffused); the conducted heat from particles 11 flows to face number 1 as represented by ray 1451 and flows to face number 2 as represented by ray 1452; cavity 557 blocks heat ray 1452 (i.e. suppresses convection) causing the conducted heat to flow to face number 1 as represented by ray 1453; the thermal radiation emitted by particles 11 flows to face number 1 as represented by ray 1454 and flows to face number 2 as represented by ray 1455; low-emissivity coating 556 reflects ray 1455 causing the thermal radiation to flow to face number 1 as represented by ray 1456; and, face number 1 of IGU 252 returns the energy in absorbed ray 1450 to an outside environment by thermal radiation and air convection (not shown) from its surface.

FIG. 2B shows the second light state of IGU embodiment 252. Sunlight ray 1457 has its visible and infrared spectrums substantially transmitted to an inside environment 1033. The progress of incident ray 1457 through IGU 252 is as follows: the air to glass interface of face number 1 reflects a part (e.g., 7%) of ray 1457; an interlayer 510 in electrophoretic glass laminate 451 absorbs 99% or more of the UV spectrum of ray 1457; an aperture 1006 in the second light state of electrophoretic laminate 451 transmits the visible and sunlight infrared spectrums of ray 1457; a low emissivity coating 556 transmits the visible and sunlight infrared spectrums of ray 1457 to cavity 557; the gas to glass interface at face number 3 reflects a part of ray 1457; and, pane 555 substantially transmits the visible and infrared spectrums of ray 1457 to an inside environment 1033.

FIG. 3A shows an embodiment 253 of an electrophoretic insulated glass unit configured for a cold climate in a first light state. One face of electrophoretic laminate 451 forms face number 4 of IGU 253 and is in contact with an inside environment 1033. The other face of 451 forms face number 3 and has a low-emissivity coating 556. The latter is in contact with sealed gas cavity 557 defined by the volume between face number 3 and face number 2 of IGU 253. Glass pane 555 is in contact with an outside environment 1034. Electrophoretic glass laminate 451's electrophoretic ink 30 has charged particles 11 that absorb the entire sunlight spectrum.

In FIG. 3A sunlight ray 1458 is absorbed by charged particles 11 in a first light state and the solar energy in its UV, visible and infrared spectrums is directed (i.e. transmitted) to an inside environment 1033. This contrasts with embodiment 252 (FIG. 2A) where the absorbed sunlight energy was transmitted to an outside environment 1034. The progress of incident ray 1458 through IGU 253 is as follows: the air to glass interface of face number 1 reflects a part of ray 1458; a low emissivity coating 556 at surface number 3 transmits the visible and sunlight infrared spectrums (losing about 7% to reflection) of ray 1458 to electrophoretic glass laminate 451; an interlayer 510 in electrophoretic glass laminate 451 absorbs 99% or more of the remaining UV spectrum of ray 1458; a first light state of electrophoretic glass laminate 451 absorbs the visible and sunlight infrared spectrums of ray 1458 using the black charged particles 11 of its electrophoretic ink 30; the absorbed energy of sunlight ray 1458 is partly conducted from particles 11 and partly emitted as thermal radiation from particles 11 in all directions (i.e. diffused); the conducted heat from particles 11 flows to face number 4 as represented by ray 1459 and flows to face number 3 as represented by ray 1460; cavity 557 blocks heat ray 1460 (i.e. suppresses convection) causing the conducted heat to flow to face number 4 as represented by ray 1461; the thermal radiation emitted by particles 11 flows to face number 4 as represented by ray 1462 and flows to face number 3 as represented by ray 1463; low-emissivity coating 556 reflects ray 1463 causing the thermal radiation to flow to face number 4 as represented by ray 1464; and, face number 4 of IGU 253 transmits the energy in absorbed ray 1458 to an inside environment 1033 by thermal radiation and air convection (not shown) from its surface.

FIG. 3B shows the second light state of IGU embodiment 253. Sunlight ray 1465 has its visible and infrared spectrums substantially transmitted to an inside environment similar to embodiment 252 in FIG. 2B. The progress of incident ray 1465 through IGU 253 is as follows: the air to glass interface of face number 1 reflects a part (e.g., 7%) of ray 1465; a low emissivity coating 556 at surface number 3 transmits the visible and sunlight infrared spectrums (losing about 7% or more to reflection) of ray 1465 to electrophoretic glass laminate 451; an interlayer 510 in electrophoretic glass laminate 451 absorbs 99% or more of the UV spectrum of ray 1465; and, an aperture 1006 in the second light state of electrophoretic laminate 451 transmits the visible and sunlight infrared spectrums of ray 1465 to an inside environment 1033.

FIG. 4A shows embodiment 251 (also shown in FIG. 1) in a first light state and is similar to FIG. 2A except embodiment 251 has a spectrally selective coating on its number 2 face. A spectrally selective coating 549 in embodiments is transparent to visible light, significantly reflects sunlight infrared owing to its cut-off wavelength being adjacent the visible spectrum, and reflects longwave infrared (i.e. thermal radiation). Sunlight ray 1466 is absorbed by charged particles 11 in a first light state and the solar energy in its UV, visible and infrared spectrums is directed (i.e. returned) to an outside environment 1034.

Sunlight ray 1466 is incident on face number 1 of IGU 251; the air to glass interface of face number 1 reflects a part of ray 1466; an interlayer 510 in electrophoretic glass laminate 450 absorbs 99% or more of the UV spectrum of ray 1466; a first light state of electrophoretic glass laminate 450 absorbs the visible and sunlight infrared spectrums of ray 1466 using the black charged particles 11 of its electrophoretic ink 30; the absorbed energy of sunlight ray 1466 is partly conducted from particles 11 and partly emitted as thermal radiation from particles 11 in all directions (i.e. diffused); the conducted heat from particles 11 flows to face number 1 as represented by ray 1467 and flows to face number 2 as represented by ray 1468; cavity 557 blocks heat ray 1468 (i.e. suppresses convection) causing the conducted heat to flow to face number 1 as represented by ray 1469; the thermal radiation emitted by particles 11 flows to face number 1 as represented by ray 1470 and flows to face number 2 as represented by ray 1471; spectrally selective coating 549 reflects ray 1471 causing the thermal radiation to flow to face number 1 as represented by ray 1472; and, face number 1 of IGU 251 returns the energy in absorbed ray 1466 to an outside environment by thermal radiation and air convection (not shown) from its surface.

FIG. 4B shows the second light state of IGU embodiment 251. Sunlight ray 1473 has its visible spectrum only substantially transmitted to an inside environment. The progress of incident ray 1473 through IGU 251 is as follows: the air to glass interface of face number 1 reflects a part (e.g., 7%) of ray 1473; an interlayer 510 in electrophoretic glass laminate 450 absorbs 99% or more of the UV spectrum of ray 1473; an aperture 1006 in the second light state of electrophoretic laminate 450 transmits the visible and sunlight infrared spectrums of ray 1473; a spectrally selective coating 549 partially or completely reflects the infrared spectrum (see infrared ray 1474) and transmits the visible spectrum of ray 1473 to cavity 557; the gas to glass interface at face number 3 reflects a part of ray 1473; and, pane 555 substantially transmits ray 1473's visible spectrum to an inside environment 1033.

FIG. 5A shows embodiment 255 in a first light state and is similar to FIG. 3A except embodiment 255 has a spectrally selective coating on its number 3 surface. Embodiment 255 reflects the sunlight infrared spectrum to an outside environment before charged particles 11 absorb the visible spectrum in a first light state, and the solar energy in the absorbed UV and visible spectrums is directed (i.e. transmitted) to an inside environment 1033. This contrasts with embodiment 253 (FIG. 3A) where all the sunlight energy was transmitted to an inside environment 1033.

Sunlight ray 1475 is incident on face number 1 of IGU 255; the air to glass interface of face number 1 reflects a part of ray 1475; a spectrally selective coating 549 at surface number 3 partially or completely reflects the infrared spectrum (see infrared ray 1476) and transmits the visible spectrum of ray 1475 to electrophoretic glass laminate 450; an interlayer 510 in electrophoretic glass laminate 450 absorbs 99% or more of the remaining UV spectrum of ray 1475; a first light state of electrophoretic glass laminate 450 absorbs the visible spectrum of ray 1475 using the black charged particles 11 of its electrophoretic ink 30; the absorbed energy of visible sunlight ray 1475 is partly conducted from particles 11 and partly emitted as thermal radiation from particles 11 in all directions (i.e. diffused); the conducted heat from particles 11 flows to face number 4 as represented by ray 1477 and flows to face number 3 as represented by ray 1478; cavity 557 blocks heat ray 1478 (i.e. suppresses convection) causing the conducted heat to flow to face number 4 as represented by ray 1479; the thermal radiation emitted by particles 11 flows to face number 4 as represented by ray 1480 and flows to face number 3 as represented by ray 1481; spectrally selective coating 549 reflects ray 1481 causing the thermal radiation to flow to face number 4 as represented by ray 1482; and, face number 4 of IGU 255 transmits the energy in absorbed ray 1475 (i.e. the visible spectrum) to an inside environment 1033 by thermal radiation and air convection (not shown) from its surface. In the earlier description of embodiment 253 (FIG. 3A) the absorbed energy transmitted to an inside environment included the sunlight infrared spectrum but coating 549 reflects this spectrum to an outside environment in embodiment 255.

FIG. 5B shows the second light state of IGU embodiment 255. Sunlight ray 1483 has its visible spectrum substantially transmitted to an inside environment 1033 and its infrared spectrum partially or completely reflected to an outside environment 1034. The progress of incident ray 1483 through IGU 255 is as follows: the air to glass interface of face number 1 reflects a part (e.g., 7%) of ray 1483; a spectrally selective coating 549 at surface number 3 partially or completely reflects the infrared spectrum (see infrared ray 1484) and transmits the visible spectrum (losing about 7% to reflection) of ray 1483 to electrophoretic glass laminate 450; an interlayer 510 in electrophoretic glass laminate 450 absorbs 99% or more of the remaining UV spectrum of ray 1483; and, an aperture 1006 in the second light state of electrophoretic laminate 451 transmits the visible spectrum of ray 1483 to an inside environment 1033.

In the figures and embodiments described up to now (i.e. FIGS. 1 to 5B) the electrophoretic ink 30 has charged particles 11 that strongly absorb sunlight's entire spectrum. But, in the IGU figures that follow (i.e. IGU embodiments) the absorption profile of charged particles is wavelength-selective and charged particles substantially transmit or reflect the sunlight infrared spectrum above a cut-off wavelength. As a first consequence of using wavelength-selective charged particles, heat build-up within an electrophoretic laminate, caused by particles absorbing sunlight energy, is about halved when compared to particles that absorb all bands and this enhances the U-value of an IGU. And, as a second consequence of using wavelength-selective charged particles, the particles themselves can direct the solar energy in the sunlight infrared spectrum substantially to either an inside environment by transmitting (see FIG. 7A) or an outside environment by reflecting (see FIG. 8A).

Charged particles derive their wavelength selectivity from colourant within their core. The cut-off wavelength (at shorter wavelengths the sunlight spectrum is absorbed) is within the range from 0.65 to 1.5 microns, and preferably 0.7 to 1.2 microns, and most preferably 0.75 to 1.0 microns. In embodiments any colourant chemistry that significantly transmits or reflects the sunlight infrared spectrum, and has proven light-fastness and weather-fastness in an outdoor paint formulation, is suitable for incorporation into wavelength-selective charged particles. The co-filed Irish Patent Application No. S2013/0181 titled "Solar Control Device, Medium and Ink" describes suitable chemistries for wavelength-selective charged particles. For example, charged particles that have a perylene black colourant within their core substantially transmit the sunlight infrared spectrum and strongly absorb the visible spectrum. In another example, charged particles that have one of $Ca_2MnO_4$, $Sr_2MnO_4$, or $Ba_2MnO_4$ colourant within their core substantially reflect the sunlight infrared spectrum and strongly absorb the visible spectrum.

In FIG. 6A embodiment 256 has an electrophoretic film 216 that has an electrophoretic ink 32 having wavelength-selective charged particles 14 that substantially transmit the sunlight infrared spectrum and absorb the visible spectrum. Sunlight is rejected by combining strong absorption of the sunlight visible spectrum by wavelength-selective charged particles 14 with the rejection of the sunlight infrared spectrum by spectrally selective coating 549 (i.e. optimized to provide an LSG of 1.25 or more as described later). Particles 14 are suspended in transparent, index-matched fluid 26 (see earlier description of fluid 20). Electrophoretic film 216 is otherwise similar to the earlier described film 202: its electrophoretic cell is 316, its electrophoretic ink layer is 1216, and its non-planar structure is 1316.

Similar to FIG. 4A, the electrophoretic insulated glass unit 256 is shown in a first light state, configured for a moderate-to-warm climate, and having a spectrally selective coating 549 on its number 2 surface. But, use of wavelength-selective charged particles 14 about halves the heat build-up and temperature rise of face 1 when exposed to strong sunlight compared to FIG. 4A's embodiment 251.

Sunlight ray 1485 is incident on face number 1 of IGU 256 similar to FIG. 4A; a first light state of electrophoretic glass laminate 452 absorbs the visible and transmits the infrared spectrums of ray 1485 using the wavelength-selective charged particles 14 of its electrophoretic ink 32; a spectrally selective coating 549 partially or completely reflects the infrared spectrum of ray 1485 to an outside environment as shown by infrared ray 1486; the conducted heat from particles 14 (from absorbed visible sunlight) flows to face number 1 as represented by ray 1487 and flows to face number 2 as represented by ray 1488; cavity 557 blocks heat ray 1488 causing the conducted heat to flow to face number 1 as represented by ray 1489; the thermal radiation emitted by particles 14 (from absorbed visible sunlight) flows to face number 1 as represented by ray 1490 and flows to face number 2 as represented by ray 1491; spectrally selective coating 549 reflects ray 1491 causing the thermal radiation to flow to face number 1 as represented by ray 1492; and, face number 1 of IGU 256 returns the energy in ray 1485 absorbed by particles 14 to an outside environment by thermal radiation and air convection (not shown) from its surface.

FIG. 6B shows the second light state of IGU embodiment 256 and is similar to that described earlier for embodiment 251 in FIG. 4B. Sunlight ray 1493 has its visible spectrum substantially transmitted to an inside environment and its infrared spectrum reflected by spectrally selective coating 549 (see reflected ray 1494). It will be appreciated that instead of using a spectrally selective coating 549 as shown in FIGS. 6A and 6B, a low-emissivity coating 556 (described in relation to FIGS. 2A and 2B) can also be used with wavelength-selective charged particles 14 in which case the sunlight infrared spectrum is transmitted to an inside environment in both the first and second light states.

FIG. 6C shows an intermediate light state in a first set of intermediate light states. Wavelength-selective charged particles 14 are partially concentrated by protrusions 2 and define apertures 1006 that have a smaller diameter than in the second light state shown in FIG. 6B. Sunlight ray 1495 is incident outside apertures 1006 and has its visible light spectrum absorbed by concentrated particles 14 and its infrared spectrum transmitted by cell 316, whereas sunlight ray 1503 has its visible and infrared spectrums substantially transmitted within apertures 1006. In both cases the transmitted infrared spectrum is reflected (see rays 1496 and 1504) to an outside environment by spectrally selective coating 549. The absorbed energy (i.e. the visible spectrum) of ray 1495 is directed to an outside environment from face 1: see conducted heat rays 1497, 1498 and 1499, and thermal radiation rays 1500, 1501 and 1502. Intermediate light states provide embodiments with a variable, black tinted appearance.

FIG. 6D is similar to FIG. 6C except it shows an intermediate light state in a second set of intermediate light states. Wavelength-selective charged particles 14 are partially concentrated adjacent a top electrode 60 and define apertures 1006. Sunlight ray 1505 is incident outside apertures 1006 and has its visible light spectrum absorbed by concentrated particles 14 and its infrared spectrum transmitted, whereas sunlight ray 1513 has its visible and infrared spectrums substantially transmitted within apertures 1006. In both cases the transmitted infrared spectrum is reflected (see rays 1506 and 1514) to an outside environment by spectrally selective coating 549. The absorbed energy (i.e. the visible spectrum) of ray 1505 is directed to an outside environment from face 1: see conducted heat rays 1507, 1508 and 1509, and thermal radiation rays 1510, 1511 and 1512.

FIG. 7A shows embodiment 257 in a first light state and having a cold climate configuration and a low-emissivity coating 556. It is similar to FIG. 3A except in embodiment 257 the wavelength-selective charged particles 14 substantially transmit the sunlight infrared spectrum and only the visible light spectrum is absorbed thereby about halving the heat build-up and temperature rise of face 4 when exposed to strong sunlight (when compared to charged particles that absorb all bands). In FIG. 7A sunlight ray 1515 has its visible spectrum absorbed in the first light state of electrophoretic laminate 453 and its infrared spectrum transmitted to an inside environment, separately, the absorbed energy (i.e. the visible spectrum) of ray 1515 is directed to an inside environment from face 4: see conducted heat rays 1516, 1517 and 1518, and thermal radiation rays 1519, 1520 and 1521.

FIG. 7B shows embodiment 257 in a second light state. Sunlight ray 1522 has its visible and infrared spectrums transmitted within an aperture 1006 similar to that described earlier for FIG. 3B. It will be appreciated that instead of using a low-emissivity coating 556 as shown in FIGS. 7A and 7B, a spectrally selective coating 549 (described in relation to FIGS. 5A and 5B) can also be used with wavelength-selective charged particles 14 in which case the sunlight infrared spectrum is reflected to an outside environment in both the first and second light states.

In FIG. 8A embodiment 258 has an electrophoretic film 281 that has infrared-reflecting electrophoretic ink 37 having wavelength-selective charged particles 17 that substantially reflect the sunlight infrared spectrum and absorb the visible spectrum. Electrophoretic film 281 and its wavelength-selective charged particles 17 are described in the co-filed Irish Patent Application No. S2013/0181 titled "Solar Control Device, Medium and Ink" Wavelength-selective charged particles 17 are suspended in transparent, index-matched fluid 27 (see earlier description of fluid 20). Electrophoretic film 281 has similarities with the earlier described film 202: its electrophoretic cell is 381, its electrophoretic ink layer is 1281, and its non-planar structure is 1381.

Similar to FIG. 2A, the electrophoretic insulated glass unit 258 is shown in a first light state, configured for a moderate-to-warm climate, and having a low-emissivity coating 556 on its number 2 surface. But, use of wavelength-selective charged particles 17 about halves the heat build-up and temperature rise of face 1 when exposed to strong sunlight compared to FIG. 2A's embodiment 252.

Sunlight ray 1523 is incident on face number 1 of IGU 258 similar to FIG. 2A; a first light state of electrophoretic glass laminate 454 absorbs the visible and directly reflects the infrared spectrum of ray 1523 using the wavelength-selective charged particles 17 of its electrophoretic ink 37 (the reflected infrared ray is shown as 1524); the diffused conducted heat from particles 17 (from absorbed visible sunlight) flows to face number 1 as represented by ray 1525 and flows to face number 2 as represented by ray 1526; cavity 557 blocks heat ray 1526 causing the conducted heat to flow to face number 1 as represented by ray 1527; the thermal radiation emitted by particles 17 (from absorbed visible sunlight) flows to face number 1 as represented by ray 1528 and flows to face number 2 as represented by ray 1529; low-emissivity coating 556 reflects ray 1529 causing the thermal radiation to flow to face number 1 as represented by ray 1530; and, face number 1 of IGU 258 returns the energy in ray 1523 absorbed by particles 17 (i.e. the visible spectrum) to an outside environment by thermal radiation and air convection (not shown) from its surface.

FIG. 8B shows the second light state of IGU embodiment 258 and is similar to that described earlier for embodiment 252 in FIG. 2B. Sunlight ray 1531 has its visible and infrared spectrums substantially transmitted to an inside environment 1033. It will be appreciated that instead of using a low-emissivity coating 556 as shown in FIGS. 8A and 8B, a spectrally selective coating 549 (described in relation to FIGS. 4A and 4B) can also be used with wavelength-selective charged particles 17 in which case the sunlight infrared spectrum is reflected to an outside environment in both the first and second light states.

FIG. 9A shows embodiment 259 in a first light state and having a cold climate configuration and a low-emissivity coating 556. It is similar to FIG. 3A except in embodiment 259 the wavelength-selective charged particles 17 substantially directly reflect the sunlight infrared spectrum and only the visible light spectrum is absorbed thereby about halving the heat build-up and temperature rise of face 4 when exposed to strong sunlight. In FIG. 9A sunlight ray 1532 has its visible spectrum absorbed in the first light state and its infrared spectrum reflected to an outside environment (see reflected infrared ray 1533), separately, the absorbed energy (i.e. the visible spectrum) of ray 1532 is directed to an inside environment 1033 from face 4: see conducted heat rays 1534, 1535 and 1536, and thermal radiation rays 1537, 1538 and 1539.

FIG. 9B shows embodiment 259 in a second light state. Sunlight ray 1540 has its visible and infrared spectrums transmitted within an aperture 1006 similar to that described earlier for FIG. 3B. It will be appreciated that instead of using a low-emissivity coating 556 as shown in FIGS. 9A and 9B, a spectrally selective coating 549 (described in relation to FIGS. 5A and 5B) can also be used with wavelength-selective charged particles 17 in which case the sunlight infrared spectrum is reflected to an outside environment in both the first and second light states.

FIG. 10 shows an IGU embodiment 260 that has a vacuum cavity 544 instead of a gas cavity 557, otherwise the IGU's arrangement and solar control through its light states are similar to that described for embodiment 256 (see FIGS. 6A and 6B). Embodiment 260 is a roof system for a vehicle and is shown in use on vehicle roof 1049. The figure shows two separate electrophoretic films 216 in one electrophoretic glass laminate 458. Embodiment 260 is shown with planar glass panes 500, 501 and 555 in FIG. 10 but in use these can be curved to conform seamlessly to a vehicle's roof. In addition, embodiment 260 can have one or more polycarbonate panes instead of glass panes, and in particular pane 555 can be polycarbonate while 500 and 501 are glass.

An advantage of using a vacuum cavity 544 in embodiment 260 is that the thickness of the cavity can be near zero (e.g., about 0.2 mm) to construct an IGU that is substantially thinner yet provides a comparable U-value to a gas filled IGU device; the thickness between faces number 1 and 4 is 10 mm or less, and preferably, 7.5 mm or less, and most preferably 5.6 mm or less. A conventional 12 mm gas cavity would be prohibitively thick for use in a vehicle.

An advantage of using an IGU embodiment in a vehicle with the electrophoretic glass laminate 458 as the outer pane is that any heat build-up due to absorbing sunlight is not transferred to a vehicle's inside environment and the temperature of the inner pane remains close to that of a vehicle's inside environment.

In the vacuum filled cavity 544 of embodiment 260 spherical spacers 541 maintain a gap between the electrophoretic glass laminate 458 and an inner pane 555. A vacuum edge seal 540 defines the extent of cavity 544. A vacuum plug 542 is located on inner pane 555. Masking elements (not shown) can be printed or enamelled on an inner surface of pane 500 to hide edge areas from view. A user interface (not shown) can be laminated to pane 555 in part of the opening area 1050 to allow a vehicle's occupants to change light states in both electrophoretic films 216.

In FIG. 10 a vehicle's roof has a sunroof opening 1050 and the face area of a 'sunroof' electrophoretic film 216 corresponds with this opening. A second electrophoretic device 216 corresponds with a painted-roof-surface 1049. Each electrophoretic film 216 is independently controlled. In FIG. 10 sunroof device 216 is in a second light state (i.e. transparent) and painted-roof-surface device 216 is in a first light state (i.e. black). It will be appreciated that a single electrophoretic film could have one of its transparent electrodes block-area patterned to correspond to the two separate films 216 shown in FIG. 10.

An embodiment of a vehicle-roof-system can cover all or part of a vehicle's roof, and an embodiment can have one or more separate electrophoretic films, and the one or more electrophoretic films can cover substantially all the face area of an embodiment or a part of its area such as corresponding to one or more roof openings. In a roof system embodiment an electrophoretic film's face area corresponding to a roof opening provides variable control of glare from the sun and/or solar transmittance in intermediate light states as well as providing visual access. An electrophoretic film's face area corresponding to an underlying roof surface acts as an electrophoretic paint and hides the underlying surface from view (with black charged particles or coloured charged particles) in a first light state and reveals it in a second light state. IGU embodiments that have a vacuum cavity are also suitable for rail, aircraft and marine applications, and glazing applications where it is necessary to minimize an embodiment's thickness. An example of passive vacuum glazing is available from Pilkington (www.pilkington.com) and called the Spacia range.

In embodiments described so far the low-emissivity coating or the spectrally selective coating was on the face of the electrophoretic laminate in contact with (i.e. exposed to) the sealed cavity 557 for both the moderate-to-warm climate and cold climate configurations of IGU embodiments, and this arrangement maximizes the solar control efficiency of embodiments. But, in alternative embodiments that are somewhat less efficient this coating can be applied to the face of a separate pane in contact with the sealed cavity. This is shown in embodiments 261 and 262 in FIGS. 11A to 12B.

Figures 11A, 11B:
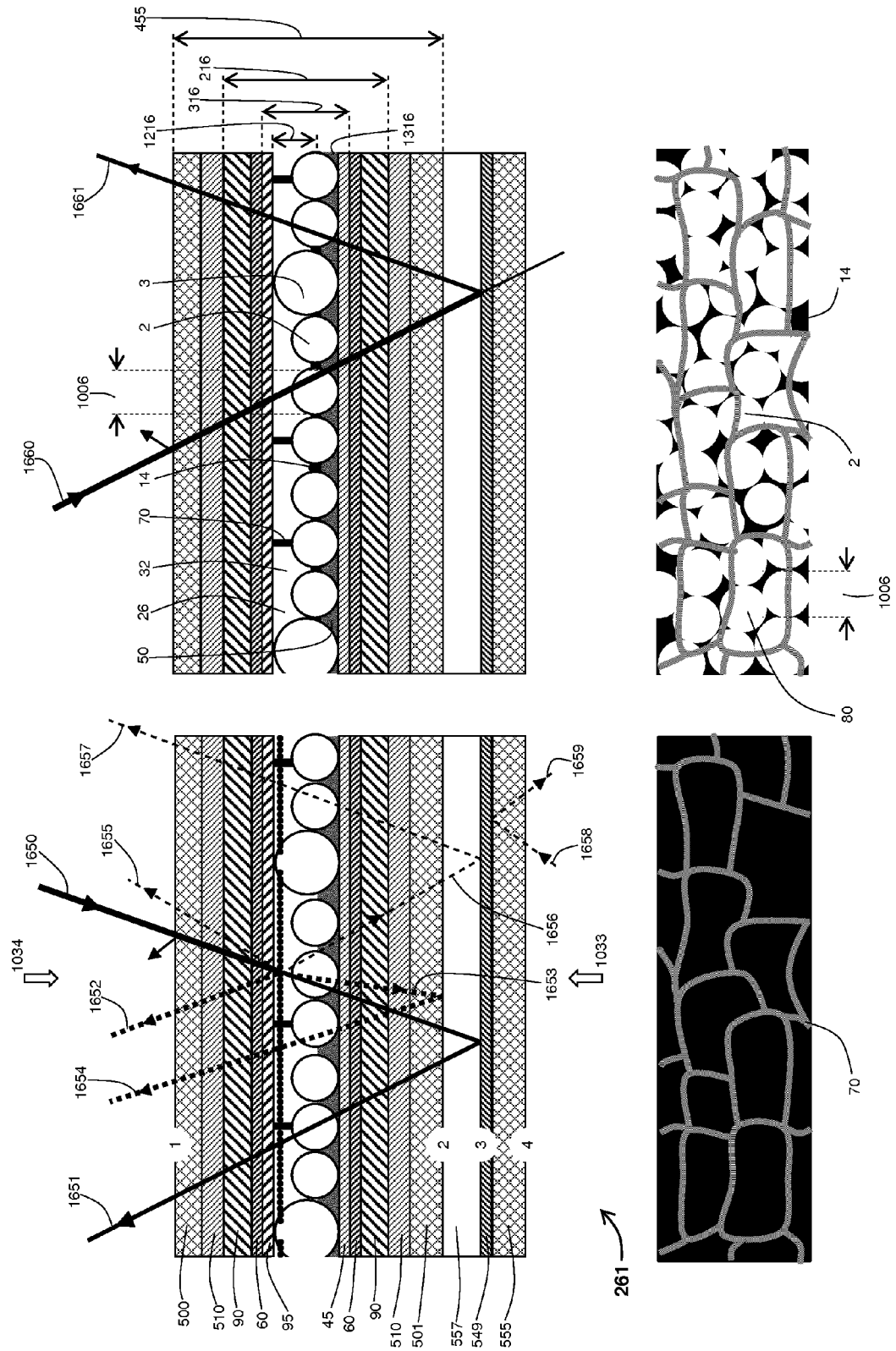
FIG. 11A shows embodiment 261 in a first light state and is similar to FIG. 6A except embodiment 261 has a spectrally selective coating on its number 3 surface.
FIG. 11B shows embodiment 261 in a second light state.

FIG. 11A shows embodiment 261 in a first light state and having wavelength-selective charged particles 14 that substantially transmit the sunlight infrared spectrum and absorb the visible light spectrum. It is in a moderate-to-warm climate configuration with a spectrally selective coating 549. It is similar to FIG. 6A except the spectrally-selective coating 549 is on the face of pane 555 in contact with cavity 557 (i.e. face number 3 of IGU 261). The electrophoretic laminate 455 does not have a coating on its face number 2. In FIG. 11A sunlight ray 1650 has its visible spectrum absorbed in the first light state and its infrared spectrum transmitted until it reaches the spectrally selective coating 549 on the number 3 face, whereupon it is reflected to an outside environment 1034 as shown by ray 1651. Separately, the absorbed energy (i.e. the visible spectrum) of ray 1650 is directed to an outside environment 1034 from face 1: see conducted heat rays 1652, 1653 and 1654, and thermal radiation rays 1655, 1656 and 1657. But, in embodiment 261 thermal radiation ray 1656 (i.e. the direction of thermal radiation flow as described earlier) is transmitted by sealed cavity 557 and not reflected to an outside environment until it reaches the spectrally selective coating 549 on face number 3.

An inefficiency arises with embodiment 261 when compared with embodiment 256 (FIG. 6A) because a low level of sunlight energy (both visible and infrared) and thermal radiation (less so) is absorbed by spectrally selective coating 549 and this absorbed energy is transmitted to an inside environment 1033 in embodiment 261 whereas embodiment 256 transmits the corresponding energy to an outside environment 1034.

An advantage of embodiment 261 is that it is more efficient at reflecting thermal radiation from an inside environment than embodiment 256 thereby enhancing an embodiment's U-value (i.e. thermal resistance). Thermal radiation ray 1658 is reflected by spectrally selective coating 549 on the number 3 surface (see reflected ray 1659) whereas in embodiment 256 thermal radiation from an inside environment is transmitted to face number 2 before being reflected resulting in a slightly lower U-value.

FIG. 11B shows embodiment 261 in a second light state. Sunlight ray 1660 has its visible and infrared spectrums transmitted within an aperture 1006 similar to that described earlier for FIG. 6B, and the spectrally selective coating 549 on the number 3 face reflects the infrared spectrum to an outside environment (see infrared reflected ray 1661) and transmits the visible spectrum to an inside environment. It will be appreciated that instead of using a spectrally selective coating 549 as shown in FIGS. 11A and 11B, a low-emissivity coating 556 (described in relation to FIGS. 2A and 2B) can also be used on a number 3 face in which case the sunlight infrared spectrum is transmitted to an inside environment in both the first and second light states. In view of the description of FIGS. 11A and 11B it will also be appreciated that in a cold climate configuration (see FIGS. 7A and 7B) the coating 556 can be on the number 2 surface and this is correspondingly less efficiency compared to embodiment 257.

In embodiments described so far the electrophoretic laminate comprises an electrophoretic film laminated between a pair of adhesive layers (e.g. EVA interlayers) and a pair of glass panes (e.g., see laminate 450 in FIG. 1). But in alternative embodiments the electrophoretic laminate can comprise an electrophoretic film applied to a rigid pane (e.g. glass or polymer) using an optical clear adhesive layer, and in these embodiments the electrophoretic film is in contact with the sealed cavity. A suitable adhesive type for applying a film to a pane is a pressure sensitive adhesive, and a suitable technique includes laminating between a pair of NIP rollers. In a similar alternative embodiment an electrophoretic laminate comprises an electrophoretic film applied to a glass laminate using an adhesive layer, and again the electrophoretic film is in contact with the sealed cavity. This latter embodiment is shown in FIGS. 12A and 12B.

In FIG. 12A IGU embodiment 262 has an electrophoretic laminate 456 comprising an electrophoretic film 216 bonded with an optical clear adhesive layer 45 to glass laminate 457. Otherwise embodiment 262 is similar to embodiment 261 described in relation to FIGS. 11A and 11B.

A particular advantage of embodiment 262 over preceding embodiments is that the glass laminate 457 is optimized to provide industry specified safety standards or enhanced performance such as mechanical, penetration protection, thermal stress resistance, sound insulation, or added decorative effects, and the electrophoretic film is optimized for variable control of solar transmittance. Preferably glass laminate 457 comprises a pair of glass panes 555 optically bonded to each other using a PVB interlayer 548 and an autoclave process. This is the industry standard glass lamination process and it cannot be applied when an electrophoretic film is included within the glass lamination process; as described earlier a lower processing temperature, an EVA interlayer, and a vacuum bag process is typical for previous electrophoretic glass laminates. It will be appreciated that embodiment 262 can have a vacuum cavity 544 and be used in a vehicle roof system application as described earlier in relation to embodiment 260 (FIG. 10). This has the advantage of using an industry qualified glass lamination product to fulfil safety requirements, and constructing the IGU embodiment incorporating this separately constructed glass laminate.

In FIG. 12A sunlight ray 1662 has its visible spectrum absorbed in the first light state and its infrared spectrum transmitted until it reaches the spectrally selective coating 549 on the number 3 face, whereupon it is reflected to an outside environment 1034 as shown by ray 1663. Separately, the absorbed energy (i.e. the visible spectrum) of ray 1662 is directed to an outside environment 1034 from face 1: see conducted heat rays 1664, 1665 and 1666, and thermal radiation rays 1667, 1668 and 1669. FIG. 12B shows embodiment 262 in a second light state. Sunlight ray 1670 has its visible and infrared spectrums transmitted within an aperture 1006 and the spectrally selective coating 549 on the number 3 face reflects the infrared spectrum to an outside environment (see infrared reflected ray 1671) and transmits the visible spectrum to an inside environment.

The expressions for sunlight that follow are based on corresponding expressions for passive glazing and defined in standards EN 400:201 for ISO 9050-03 for example. See ISO 15099-03 or EN 674 for a definition of U-value. The expressions for embodiments include energy from all three sunlight spectrums/bands (i.e. UV+visible+infrared). Each light band has an associated reflectance, transmittance and absorptance. Visible light reflectance is referred to as VLR, visible light transmittance as VLT, and visible light absorptance as VLA. Absorbed energy from all three light bands is combined as heat/thermal energy and in embodiments substantially transmitted to either an outside environment or an inside environment depending on the configuration of the IGU.

Sunlight is between 0.3 micron and 2.5 micron and is divided into bands or spectrums referred to as ultraviolet (UV) light (i.e. 0.3 to 0.38 micron), visible light (i.e. 0.38 to 0.78 micron) and sunlight infrared (i.e. 0.78 to 2.5 micron). When sunlight is incident on an embodiment of an IGU its solar energy is divided into:

a) a solar energy fraction reflected directly to an outside environment (referred to as SER or direct solar reflectance);

b) a solar energy fraction transmitted directly through an IGU (referred to as SET or direct solar transmittance); and, c) a solar energy fraction absorbed by an IGU (referred to as SEA or direct solar absorptance); the absorbed energy results in heat transfer by convection and longwave infrared radiation, and the resulting heat transfer is divided into a fraction transmitted to an outside environment (referred to as $SEA_{OUT}$ or the secondary external heat transfer factor) and a fraction transmitted to an inside environment (referred to as $SEA_{IN}$ or the secondary internal heat transfer factor).

The three fractions sum as follows:

SER+SET+SEA=1 where SEA=$SEA_{OUT}$+$SEA_{IN}$

The Solar Heat Gain Coefficient (SHGC) represents the energy fraction arising from sunlight that is transmitted by an IGU embodiment and is:

SHGC=SET+$SEA_{IN}$

In passive glazing the SHGC is also known as the solar factor (SF) and denoted by symbol g. The shading coefficient is the relative solar response of an IGU embodiment to a 3 mm clear float glass pane and is simply a division of an IGU's SHGC by 0.87.

Shading Coefficient (SC)=SHGC/0.87

The selectivity or light to solar gain ratio (LSG) of an IGU embodiment is the ratio of visible light transmittance (VLT) to SHGC. It measures between 0 and about 2.25 and in passive glazing (i.e. not incorporating an electrophoretic cell) a value of 1.25 or more is considered to be spectrally selective glazing or so called 'green' glazing since it prioritizes visible light transmission over solar energy transmission, or it seeks to maximize visible light transmission and minimize transmission of sunlight UV and sunlight infrared.

LSG=VLT/SHGC

Most of the major glass manufacturers have a range of clear float glass panes with low-emissivity coatings that are suitable for use as coating 556 in IGU embodiments. A low-emissivity coating provides an infrared cut-off wavelength adjacent the thermal radiation spectrum and acts as a shortpass filter for the visible and sunlight infrared spectrums. They are generally applied using a pyrolytic process as described later. Coated glass panes are available with different maximum visible light transmittances and SHGCs and work synergistically with the electrophoretic laminate in IGU embodiments providing adaptability for an operating climate. Any coated glass that in an IGU configuration (coating on the number 2 or 3 surface) offers a ratio of visible light transmittance to SHGC (i.e. LSG) of less than 1.25, and preferably 1.15 or less, and more preferably 1.10 or less, is classified as a low-emissivity coating 556 herein (i.e. a glass pane having coating 556). Typically the LSG of available pyrolytic coated glass is 1.0 to 1.15. Preferably the low-emissivity coated glass is hard coated, easily toughenable, tolerant of heat soaking without loss of optical performance, and is scratch resistant. For example, the Asahi Glass Company's (see www.agc.com) Planibel G fasT, a pyrolytic-coated, clear float glass, meets this criteria; in a double-glaze, passive IGU it has a visible light transmittance of 75%, a SHGC of 0.74 and an LSG of 1.01.

IGU embodiments configured for moderate-to-hot climates and having a low-emissivity coating (e.g., IGU 252 or IGU 258) can reduce heating due to sunlight to near zero in a first light state when its black charged particles absorb (or absorb and reflect) all sunlight bands. This results in a significant saving in cooling costs in hot weather. A first light state of such embodiments provides a near-zero direct solar energy (UV, visible and sunlight infrared) transmittance level (SET) and a SHGC of 0.15 or less, and preferably 0.12 or less, and more preferably 0.10 or less. The corresponding shading coefficient (SC) in a first light state is 0.172, 0.138, and 0.115 respectively. A second light state in such embodiments transmits visible and sunlight infrared (i.e. it transmits direct solar energy only) and has a SHGC of 0.6 or less, and more preferably 0.55 or less, and most preferably 0.50 or less (assuming clear float glass panes are used). The visible light transmittance (assuming clear float glass panes) in a second light state is 45% or more, preferably 50% or more, and most preferably 55% or more. The corresponding LSG ratio in a second light state is typically 0.9 to 1.10.

In addition, in these embodiments (e.g., IGU 252 or IGU 258) intermediate light states in a first set (reached by transitioning from a first light state) provide a range of variable SETs and SHGCs, and embodiments have an increasing SET and SHGC (i.e. decreasing absorptance) as the second light state is approached. Correspondingly, intermediate light states in a second set (reached by transitioning from a second light state) provide a range of variable SET and SHGCs, but embodiments have decreasing SET and SHGC (i.e. increasing absorptance) as the first light state is approached. These embodiments are also constructed to reflect thermal radiation from an outside environment 1034 using the low-emissivity coating 556 on the number 2 surface thereby further reducing cooling requirements.

Example 1

Warm Climate Configuration Having a Coating with the Infrared Cut-Off Wavelength Adjacent the Thermal Radiation Spectrum The following is an example of an embodiment 252, a configuration for moderate-to-hot climates, which maximizes the available range of SHGC (i.e. the SHGC range is up to twice that of embodiment 251). Embodiment 252 uses Pilkington (see www.pilkington.com) Energy Advantage OW, a pyrolytic-coated, low-emissivity, extra-clear glass as pane 501 of electrophoretic glass laminate 451 with the low-emissivity coating 556 on the number 2 surface (see FIG. 2A). The electrophoretic film 202 used in electrophoretic laminate 451 had a VLT of about 0.70. In a second light state the IGU embodiment 252 has a visible light transmittance of about 52.5%, a SHGC of about 0.48 (down from 0.69 for Energy Advantage OW in a passive IGU), and an LSG ratio of about 1.09 (the same as Energy Advantage OW in a passive IGU). In an intermediate light state IGU embodiment 252 has a visible light transmittance of 35%, a SHGC of about 0.32, and an LSG ratio of about 1.09. In another intermediate light state IGU embodiment 252 has a visible light transmittance of 25%, a SHGC of about 0.23, and an LSG ratio of about 1.09. The U-value of this double-glaze IGU embodiment 252 is about 1.5 W/(m²·K) with a 4 mm inner clear pane of Pilkington Optiwhite, 4 mm panes for the electrophoretic glass laminate 451 (Optiwhite), and a 16 mm argon gas cavity 557.

As previously described, embodiment 253 (see FIGS. 3A and 3B), a construction for cold climates, absorbs the energy in visible sunlight and sunlight infrared in a first light state. In contrast to embodiment 252 this energy is harvested by transmitting it to an inside environment 1033 where it contributes to heating. IGU embodiment 253 reflects thermal radiation from an inside environment 1033 using the low-emissivity coating 556 on the number 3 surface thereby significantly decreasing an IGU's U-factor (i.e. thermal transmittance). IGU 253 has a near constant SHGC that is independent of its light states (this contrasts with a variable SHGC in embodiment 252). Its LSG ratio varies with light states from a maximum in a second light state (e.g. about 1.0 to 1.1) to 0.07 or less in a second light state.

Example 2

Cold Climate Configuration Having a Coating with the Infrared Cut-Off Wavelength Adjacent the Thermal Radiation Spectrum The following is an example of an IGU 253 that maximizes the solar energy transmitted to an inside environment using a configuration for cold climates. Embodiment 253 uses Asahi Glass Company (see www.agc.com) Planibel G fasT low-emissivity glass as pane 501 of electrophoretic glass laminate 451 with the low-emissivity coating 556 on the number 3 surface (see FIG. 3A). The electrophoretic film 202 used in electrophoretic laminate 451 had a VLT of about 0.70. The IGU embodiment has a SHGC of about 0.74 (the same as Planibel G fasT in a passive IGU) in all light states. In a second light state visible light transmittance is about 52.5%, and the LSG ratio is about 0.71 (down from 1.01 for Planibel G fasT in a passive IGU). In an intermediate light state visible light transmittance is 25%, and the LSG ratio is about 0.34. In another intermediate light state visible light transmittance is 12.5%, and the LSG ratio is about 0.17. The U-value of this double-glaze IGU embodiment 212 is about 1.5 W/(m²·K) with a 6 mm outer clear pane of Planibel Clearvision, 4 mm panes for the electrophoretic glass laminate (Planibel Clearvision), and a 16 mm argon gas cavity 557.

Most of the major glass manufacturers have a range of clear float glass panes with spectrally selective coatings that are suitable for use as coating 549 in IGU embodiments. A spectrally selective coating provides an infrared cut-off wavelength adjacent the visible spectrum and acts as a shortpass filter for visible sunlight only. They are generally applied using an MSVD process as described later. Coated glass panes are available with different maximum visible light transmittances and SHGCs and work synergistically with the electrophoretic laminate in IGU embodiments providing adaptability for an operating climate. Any coated glass that in an IGU configuration (coating on the number 2 or 3 surface) offers a ratio of visible light transmittance to SHGC (i.e. LSG) of 1.25 or more, and preferably 1.35 or more, is suitable as a spectrally selective coated glass 549 herein (i.e. a glass pane coated with coating 549). As previously described, if a coated glass has an LSG less than 1.25 (preferably 1.15 or less) then it is classified as a low-emissivity, coated glass 556 herein. Preferably the spectrally selective coated glass can be heat toughened and heat soaked without loss of optical performance, and has some scratch resistant. For example, the Asahi Glass Company Planibel Top N+T, an MSVD-coated, clear float glass, meets this criteria; in a double-glaze, passive IGU it has a visible light transmittance of 80%, a SHGC of 0.64 and an LSG of 1.25.

In embodiment 251, shown in FIGS. 4A and 4B, incident sunlight that is transmitted by a second light state of electrophoretic glass laminate 450 contains both visible sunlight and sunlight infrared. Spectrally selective coating 549 partially or completely rejects the sunlight infrared in the transmitted sunlight and as a consequence up to halves embodiment 251's SHGC with respect to embodiment 252 in FIG. 2B. In IGU embodiment 251 the LSG ratio is held near constant for at least half the range of intermediate light states while the SHGC is varied using intermediate light states. The SHGC has a maximum in a second light state of 0.475 or less, and preferably 0.45 or less, and more preferably 0.40 or less, to a minimum in a first light state of 0.10 or less. In IGU embodiment 251 a spectrally selective coating 549 determines the LSG and is used to achieve an LSG of between 1.25 and 2.25 for a second light state and for at least half the range of intermediate light states adjacent a second light state.

As demonstrated in the following examples 3 and 4, in embodiment 251 an incorporated spectrally selective coating 549 works synergistically with an electrophoretic cell to significantly reduce the SHGC from that available with either on their own yet maintain the LSG ratio available with a spectrally selective coating 549 on its own. In embodiments the higher the LSG ratio for a given light state the less sunlight energy that is transmitted to an inside environment. Embodiment 251 reduces cooling costs in hot weather in architectural and automotive embodiments when compared to embodiment 252.

Example 3

Hot Climate Configuration Having a Coating with the Infrared Cut-Off Wavelength Adjacent the Visible Spectrum The following is an example of an embodiment 251, a configuration for hot climates, that minimizes solar heat transmitted to an inside environment 1033 while maximizing visible light transmitted (i.e. it demonstrates how an embodiment can maximize the LSG ratio). Embodiment 251 uses Asahi Glass Company's Planibel Energy NT spectrally selective glass (see www.yourglass.com) as pane 501 of electrophoretic glass laminate 450 with the spectrally selective coating 549 on the number 2 surface (see FIG. 4A). The electrophoretic film 202 used in glass laminate 450 had a VLT of about 0.70. In a second light state the IGU embodiment 251 has a visible light transmittance of about 52.5%, a SHGC of about 0.32 (down from 0.45 for Planibel Energy NT in a passive IGU), and an LSG ratio of about 1.67 (the same as Planibel Energy NT in a passive IGU). In an intermediate light state IGU embodiment 251 has a visible light transmittance of 35%, a SHGC of about 0.21, and an LSG ratio of about 1.67. In another intermediate light state IGU embodiment 251 has a visible light transmittance of 25%, a SHGC of about 0.15, and an LSG ratio of about 1.67. The U-value of this double-glaze IGU embodiment 251 is about 1.0 W/(m$^2$·K) with a 4 mm inner clear pane of Planibel Clearvision, 4 mm panes for the electrophoretic glass laminate 450 (Planibel Clearvision), and a 16 mm argon gas cavity.

The surprisingly efficient solar performance of IGU embodiment 251 is demonstrated by comparing it with a leading manufacturer's electrochromic insulating glass unit. The latter technology is recognized as offering significant energy savings in hot climates by the US NFRC and others. Sage Electrochromics, Inc. guide specification (see www.sageglass.com) for an electrochromic (EC) IGU has a maximum visible light transmission of 62%, a maximum SHGC of 0.47, and a maximum LSG ratio of 1.32. The latter two measures of solar performance (i.e. SHGC and LSG) are inferior to that shown in the previous example of embodiment 251. The Sage EC window has a Summer U-value of 1.82 W/(m$^2$·K) and a Winter U-value of 1.87 W/(m$^2$·K) for a 12.5 mm argon filled cavity and so this measure of thermal performance is also inferior to the previous example of embodiment 251.

Example 4

Hot Climate Configuration Having a Coating with the Infrared Cut-Off Wavelength Adjacent the Visible Spectrum The following is an example of an IGU 251 that maximizes its visible light transmittance at the expense of a higher solar heat transmittance to an inside environment (i.e. it demonstrates how an embodiment's properties can be adapted for an application). Embodiment 251 uses Asahi Glass' Planibel Top N+T spectrally selective glass (see www.yourglass.com) as pane 501 of glass laminate 450 with the spectrally selective coating 549 on the number 2 surface. The electrophoretic film 202 used in glass laminate 450 had a VLT of about 0.75 and used ITO electrodes with antireflection coatings. In a second light state IGU 251 has a visible light transmittance of about 60%, a SHGC of about 0.48 (down from 0.64 for Planibel Top N+T in a passive IGU), and an LSG of about 1.25 (the same as Planibel Top N+T in a passive IGU). In an intermediate light state IGU embodiment 251 has a visible light transmittance of 35%, a SHGC of about 0.28, and an LSG ratio of about 1.25. The U-value of this double-glaze IGU embodiment 251 is about 1.1 W/(m$^2$·K) with a 4 mm outer clear pane of Planibel Clearvision, 2 mm panes for the electrophoretic glass laminate 450 (Planibel Clearvision), and a 16 mm argon gas cavity.

Embodiment 255, shown in FIGS. 5A and 5B, has similarities with embodiment 253 (shown in FIGS. 3A and 3B) except that a spectrally selective coating 549 reflects substantially sunlight infrared and as a consequence up to halves IGU 255's SHGC with respect to embodiment 253, and up to halves the sunlight energy absorbed by IGU 255 in a first light state in embodiments that have black charged particles that absorb the sunlight infrared spectrum. Furthermore, in embodiment 255 spectrally selective coating 549 partly or completely protects or shields electrophoretic glass laminate 450 from sunlight infrared. Embodiment 255 is suited to use in transport applications such as a vehicle's roof as an alternative to embodiment 260 in FIG. 10.

In embodiment 255 an incorporated spectrally selective coating 549 works synergistically with an electrophoretic cell to hold the SHGC near constant—independent of its light states—while the LSG ratio is varied using intermediate light states. In IGU embodiment 255 a spectrally selective coating 549 determines the SHGC and is used to achieve a SHGC of 0.6 or less, and preferably 0.525 or less, and more preferably 0.45 or less. The solar performance of an embodiment for a specific climate or region can be optimized by selecting a spectrally selective coating that has an optimum SHGC for that climate or region. In cold, sunny weather indoor thermal radiation is reflected by IGU 255 to minimize heat loss (i.e. lower U-value) yet visible sunlight energy is transmitted to an inside environment in all light states to lower heating costs.

Example 5

Cold Climate Configuration Having a Coating with the Infrared Cut-Off Wavelength Adjacent the Visible Spectrum The following is an example of an IGU embodiment 255 that minimizes solar heat transmitted to an inside environment in an IGU configuration for cold climates while maximizing visible light transmitted (i.e. it demonstrates how an embodiment can maximize its LSG ratio). Embodiment 255 uses Pilkington (see www.pilkington.com) Suncool 70/40 spectrally selective glass as pane 501 of electrophoretic glass laminate 450 with the spectrally selective coating 549 on the number 3 surface (see FIG. 5A). The electrophoretic film 202 used in glass laminate 450 had a VLT of about 0.70. The IGU embodiment has a SHGC of about 0.43 (the same as Suncool 70/40 in a passive IGU) in all light states. In a second light state visible light transmittance is about 49%, and the LSG ratio is about 1.14 (down from 1.63 for Suncool 70/40 in a passive IGU). In an intermediate light state visible light transmittance is 25%, and the LSG ratio is about 0.58. In another intermediate light state visible light transmittance is 12.5%, and the LSG ratio is about 0.29. The U-value of this double-glaze IGU embodiment 255 is about 1.1 W/(m$^2$·K) with a 6 mm outer clear pane of Pilkington Optifloat, 4 mm panes for the electrophoretic glass laminate (Pilkington Optiwhite), and a 16 mm argon gas cavity.

Example 6

Cold Climate Configuration Having a Coating with the Infrared Cut-Off Wavelength Adjacent the Visible Spectrum The following is an example of an IGU 255 that maximizes its visible light transmittance and allows a higher solar heat transmittance to an inside environment by only partially reflecting sunlight infrared (i.e. it demonstrates how an embodiment's properties can be varied for an application). Embodiment 255 uses Saint Gobain (SGG) Planitherm Ultra spectrally selective glass (see www.saint-gobain-glass.com) as pane 501 of electrophoretic glass laminate 450 with the spectrally selective coating 549 on the number 3 surface. The electrophoretic film 202 used in glass laminate 450 had a VLT of about 0.75 and used silver nanowires electrodes. The IGU 255 has a SHGC of about 0.63 (the same as Planitherm Ultra in a passive IGU) in all light states. In a second light state visible light transmittance is about 60%, and the LSG ratio is about 0.95 (down from 1.27 for Planitherm Ultra in a passive IGU). In an intermediate light state visible light transmittance is 25%, and the LSG ratio is 0.40. In another intermediate light state visible light transmittance is 12.5%, and the LSG ratio is 0.20. The U-value of this double-glaze IGU embodiment 255 is about 1.1 W/(m$^2$·K) with a 4 mm outer clear pane of SGG Planilux, 4 mm panes for the electrophoretic glass laminate (Planilux), and a 16 mm argon gas cavity. The corresponding U-value for a 12 mm argon cavity is 1.3 W/(m$^2$·K).

The U-value (i.e. thermal transmittance) of an embodiment for a specific climate or region is largely determined by the cavity (i.e. gas/vacuum and width) and the number of panes in an IGU, similar to passive IGUs. Selecting a spectrally selective coating with as high an LSG ratio as possible and/or by using an additional low-emissivity coating 556 on a number 3 or 4 face optimizes the U-value in embodiments. An IGU embodiment that has a triple glaze construction has a lower U-factor than similarly configured double glaze IGUs. Typically the U-value of a triple glaze embodiment will be 1.3 W/(m$^2$·K) or less, and better IGUs will be 1.0 W/(m$^2$·K) or less. Increasing the number of glazing panes beyond three brings ever decreasing improvements in the U-factor. In triple glazing and multiple glazing embodiments a glass laminate embodiment must be the innermost pane (i.e. in contact with an inside environment 1033) or the outermost pane (i.e. in contact with an outside environment 1034) so that sunlight energy absorbed by an electrophoretic laminate can be convected from a face in contact with an environment.

Next, processes for applying a coating to a glass pane that is transparent to visible light and which rejects infrared light greater than a cut-off wavelength is described. There are two main technologies for applying coatings 556 and 549: chemical vapor deposition (CVD) of which pyrolytic is a specifc example, and physical vapour deposition (PVD) of which magnetron sputtering vacuum deposition (MSVD) is a specific example. A pyrolytic coating is a multi-layer, transparent, ceramic semiconductor (i.e. a semiconducting oxide layer such as ITO) with a bi-layer, optical undercoat. It is also referred to as a hard coat. A pyrolytic process is suited to implementing low-emissivity coating 556 but generally proves inadequate for a spectrally selective coating 549.

A pyrolytic coating is produced by a CVD coating technology that is on-line and integrated directly into a float glass manufacturing process. This lowers manufacturing costs compared to off-line MSVD technology. The advantages of CVD include a high deposition rate, a high degree of control, and a coating that is covalently bonded to a glass surface making it durable. A pyrolytic, low-emissivity coating has an emissivity of generally between 0.15 and 0.30 which is higher than generally available with MSVD coatings. In embodiments the lower the emissivity value of a coating the greater the reflection of thermal radiation.

An MSVD coating has multiple metallic layers, or metallic and semiconductor layers, and antireflection layers that are dielectric oxides. It can also be referred to as a soft coat (thought an MSVD can have hard coat properties). An MSVD coating is produced by a PVD coating technology that is off-line with respect to a float glass manufacturing process. The principal advantages of sputtering are the ability to deposit both pure metals and metal compounds (nitrides, oxides, etc.) and the ready availability of precursors, which are typically targets, manufactured from highly pure metals and various reactant gases, and the most energy efficient coatings are silver-dielectric multilayers. However, unlike pyrolytic coatings, MSVD coatings can be environmentally unstable due to having silver layers and generally must be enclosed in an IGU to maintain their properties over time. MSVD coatings have an emissivity of between 0.02 and 0.10 making them a better reflector of thermal radiation than pyrolytic, low-emissivity coatings. In general, MSVD coatings are more neutral with respect to visible light transmission than pyrolytic coating; MSVD coatings allow higher visible light transmittance than pyrolytic coatings; and, MSVD coatings can be optimized to reflect a significant part of sunlight infrared. An MSVD process is suited to implementing a low-emissivity coating 556 and a spectrally selective coating 549, but because pyrolytic coatings have a significantly lower manufacturing cost than MSVD coatings, a pyrolytic process is favoured for low-emissivity coating 556 and an MSVD process for spectrally selective coating 549.

The previous description described a pyrolytic process for CVD and an MSVD process for PVD, however any of the coating technologies of CVD or PVD from the prior art can be used to implement low-emissivity coating 556 or spectrally selective coating 549. Examples of PVD coating technologies include: cathodic arc deposition, electron beam physical vapor deposition, evaporative deposition, pulsed laser deposition, and other sputter deposition variants.

Multi-layer coatings for use as low-emissivity coating 556 or spectrally selective coating 549 contain layers that have free electrons (e.g., metals or semiconductors) and possess a plasma frequency. The corresponding plasma wavelength (i.e. (light velocity in the layer)/(plasma frequency)) falls within the sunlight infrared part of the light spectrum and is adjacent or near the thermal radiation spectrum for low-emissivity coatings 556 and adjacent or near the visible spectrum for spectrally selective coatings 549. Multi-layer coatings reject infrared light that has a wavelength greater than its cut-off wavelength using the optical properties of its different layers, and thin-film interference optimized by the optical stack design of its multi-layer coating; and infrared light rejection can include reflection, destructive interference, and absorption.

Next, managing the heat build-up in embodiments is described. Embodiments that absorb a significant proportion of sunlight energy in a first light state, and in particular sunlight infrared, heat-up significantly. For example, an embodiment's face in contact with an outside environment can heat up by about 0.04 to 0.07° C./W/m$^2$ over the outside environment temperature. To dissipate all of the energy in the sunlight visible spectrum in a warm climate from a glass face, that is 445 W/m$^2$, would require a face temperature of 17.8 to 31.1° C. above the outside environment's temperature. The range is a rough indication or guide only since wind velocity has a significant bearing on convective heat transfer from an embodiment's face.

As described earlier, the absorbed sunlight energy that is subsequently transmitted from a face of an electrophoretic laminate in an IGU to an environment has two primary components: the first is thermal radiation and the second is convected heat and is strongly dependent on air velocity/flow across a face. The significance of thermal conduction in embodiments is that the layers within an electrophoretic laminate allow a significant proportion of sunlight energy absorbed by charged particles to flow as conducted heat from an electrophoretic cell in the centre of a laminate to an outer face where it can be radiated and convected. The method herein to maximize conducted heat flow from charged particles to a face in contact with an environment is through selection of layer materials that maximize thermal conductance and through minimizing the thickness of layers between charged particles and that face.

With respect to the former, materials generally classified as thermally insulating (i.e. having a thermal conductivity of <0.065 W/(m·K)) are avoided in electrophoretic films (e.g., 202) and electrophoretic laminates (e.g., 450). The different polymer materials in embodiments have a thermal conductivity of 0.1 W/(m·K) or more, and preferably of 0.15 W/(m·K) or more, and more preferably of 0.2 W/(m·K) or more.

Furthermore, a high thermal conductivity polymer sheet can replace a glass pane in contact with an environment when its thermal conductivity is similar to glass (or higher than glass) and preferably has a thermal conductivity of 0.5 W/(m·K) or more, and most preferably 0.75 W/(m·K) or more. An example of a polymer material that has high thermal conductivity for use in such a sheet (i.e. in contact with an environment) is the Apec range of optically transparent co-polycarbonates from Bayer. The Apec polymer material has a thermal conductivity greater than glass making such material especially suitable as a replacement for glass in automotive and transport embodiments. Other examples of high thermal conductivity polymers include those having nm scale dispersed metallic filler particles or carbon-nano-tube (CNT) filler particles. In embodiments the thermal conductivity of a film substrate can be doubled or more by using dispersed nm scale metallic or CNT particles, and similarly the thermal conductivity of an interlayer 510 can be doubled or more using filler particles.

With respect to the thickness of polymer layers within an embodiment, the thickness of film substrates such as PET (thermal conductivity 0.15 to 0.24 W/(m·K)) or PBT (thermal conductivity 0.29 W/(m·K)) and interlayers such as EVA (thermal conductivity 0.23 W/(m·K)) is minimized to maximize thermal conductivity in a glass laminate. Preferably the thickness of a film substrate is 200 micron or less, more preferably 175 micron or less, and most preferably 125 micron or less. Preferably the thickness of an interlayer is 0.8 mm or less, more preferably 0.5 mm or less, and most preferably 0.38 mm or less. A preferred EVA interlayer is the Sekisui S-LEC EN in 0.25 mm thickness.

In the following example a calculation of the conductive heat flow is made for an embodiment 252 that is used as an architectural glazing in a hot climate. IGU 252's electrophoretic laminate 451 has a 4 mm clear glass in contact with an outside environment 1034 and a 6 mm, low-emissivity coated clear glass in contact with cavity 557 (see FIGS. 2A and 2B). Solar heat flows from charged particles 11 within electrophoretic cell 302 in the centre of laminate 451 to a face 1 exposed to outside environment 1034. The thermal conductance (TC) and thermal resistance (TR) of each layer per square meter of face area and per one degree kelvin difference across a layer is:

$$TC \text{ of } PET_{175 \text{ micron}} = [0.2 \text{ W}/(\text{m·K})]/175 \text{ micron} = 1,142.9 \text{ W/m}^2\text{·K}$$

$$TC \text{ of } EVA_{0.25 \text{ mm}} = [0.23 \text{ W}/(\text{m·K})]/0.25 \text{ mm} = 920 \text{ W/m}^2\text{·K}$$

$$TC \text{ of glass}_{4 \text{ mm}} = [1 \text{ W}/(\text{m·K})]/4 \text{ mm} = 250 \text{ W/m}^2\text{·K}$$

$$TR \text{ of } PET_{175 \text{ micron}} = 8.75 \times 10^{-4} \text{ m}^2\text{·K/W}$$

$$TR \text{ of } EVA_{0.25 \text{ mm}} = 1.09 \times 10^{-3} \text{ m}^2\text{·K/W}$$

$$TR \text{ of glass}_{4 \text{ mm}} = 4.0 \times 10^{-3} \text{ m}^2\text{·K/W}$$

$$\text{Conductive Heat Flow}_{(cell \text{ to } face \text{ 1})} = 1/(8.75 \times 10^{-4} + 1.09 \times 10^{-3} + 4.0 \times 10^{-3}) = 167.6 \text{ W/m}^2\text{·K}$$

The corresponding calculation for an automotive embodiment uses glass panes that are 26 mm thick and results in a conductive heat flow from the electrophoretic cell to face 1 of the IGU of 219 W/m$^2$·K. In embodiments the thickness of layers between an electrophoretic cell and a face in contact with an environment are a minimum as allowed for a particular application, glass area, and industry standard in order to maximize conductive heat flow. This requirement to maximize heat flow in an element of a window runs contrary to the prior art of window design where heat flow (i.e.

thermal transmittance) as expressed by a U-value (or its reciprocal R-value) is minimized for each element.

The conductive heat flow calculations give surprising results. By minimizing the thickness of the polymer layers their resultant thermal resistance was significantly smaller than that of 4 mm or 2.6 mm glass panes. By minimizing the thickness of a front glass (possible because of the laminate structure of embodiments) the conductive heat flow of an electrophoretic glass laminate for an architectural application (167.6 W/m$^2$·K) is similar to that of a 6 mm monolithic glass (166 W/m$^2$·K). In this example a 4.7 degree Kelvin difference between an electrophoretic cell 302 and face 1 of electrophoretic laminate 451 results in 788 W per square meter of conductive heat flow. This level is equivalent to the maximum solar energy of sunlight in the US standard NFRC 100-2001 Summer.

Furthermore, a 4.7 degree Kelvin difference between an electrophoretic cell 302 and face 1 of laminate 451 is an exaggeration and does not include the heat diffusing effect of thermal radiation or the solar energy reflected or absorbed before reaching the electrophoretic cell. An electrophoretic cell within an electrophoretic IGU embodiment will never be required to absorb all of the solar energy in a first light state. Sunlight generally makes an angle up in an embodiment's face and reflection will cause about 7% solar reflection (particularly for vertical glazing). The solar transmittance of 4 mm, high-quality, clear, float glass is about 85% (with visible at 90% and UV at 68%). An EVA interlayer absorbs the remaining UV and transmits about 90% of solar light. About 80% or less of incident solar light energy on an IGU embodiment reaches an electrophoretic cell.

Within an electrophoretic laminate heat also flows through thermal radiation and most thermal energy radiates in the range 3 to 25 micron (in particular 3 to 15 micron) for objects between 0° C. and 100° C. Polymers can transmit some of this thermal radiation, particularly if their thickness (w.r.t. path of light) is about 25 micron or less such as the polymers within an electrophoretic cell (e.g., polymer balls 4 to 8, space filling polymer 50, and polymer wall 70). Preferably the materials in an embodiment's electrophoretic cell substantially transmit thermal radiation thereby resulting in an immediate heat flow (i.e. the energy in the transmitted thermal radiation) from an electrophoretic cell to the rest of the glass laminate. In this regard acrylates and methacrylate polymer are suitable. Preferably an electrophoretic film's (e.g., 202 in FIGS. 2A and 2B) electrodes 60 partially or substantially transmit thermal radiation.

As a consequence of heat build-up due to absorbing sunlight energy the electrophoretic laminate panes 500 and 501 are subject to significant thermal shocks, and it has been found that the panes need to be resilient to thermal stress. Preferably an electrophoretic laminate's panes (500 and 501), which can be any of the types described already, are treated to make them more resilient to thermal shock using one of the following processes: heat strengthening (e.g., as per EN 1863-1), chemical toughening (e.g., as per EN 12337-1), or thermal toughening (e.g., as per EN 12150-1). But any of these three processes, while improving resilience to the thermal shock can still leave a low level of glass panes liable to spontaneous breakage. Spontaneous breakage can arise in embodiments because thermal stress can cause critical transformations in nickel sulfide (NiS) particles dispersed in float glass. In a float glass process an NiS particle changes in size from what is known as a low-temperature structure to a high-temperature, crystalline structure. When cooled quickly as part of a glass treatment process some NiS particles are unable to revert to their original low-temperature form. But due to thermal stress and time in embodiments NiS particles will slowly revert with an increase in volume that can cause spontaneous glass breakage.

In the most preferred embodiments a risk of spontaneous breakage due to thermal stress can be greatly reduced or eliminated by subjecting glass that was already treated to be heat-strengthened, chemically-toughened, or thermally-toughened, to a heat soak test or treatment (e.g., as per EN 14179-1) that through a process of elimination identifies good panes for use in the electrophoretic laminates of embodiments. A heat soak test or treatment consists of placing prior treated glass panes in a furnace at a defined temperature and for a defined duration in order to promote and accelerate the transformation of NiS particles and cause critical particles to break susceptible panes. Heat soaking is performed on glass panes before using them in an embodiment's electrophoretic laminate. Glass is cut to size before treating or heat soaking.

The invention claimed is:

1. An electrophoretic insulated glass unit (IGU) comprises an electrophoretic laminate and a pane spaced apart from said electrophoretic laminate, the respective inner faces of said laminate and said pane defining a sealed cavity there between, and an outer face of said electrophoretic laminate being in contact with an environment, one inner face of said cavity having a coating that is transparent to visible light and which rejects infrared light greater than a cut-off wavelength;

wherein said electrophoretic laminate includes an electrophoretic device including charged particles of at least one type in an electrophoretic cell, the particles being responsive to an electric field applied to said electrophoretic device to move between: a first extreme light state in which particles are maximally spread within said cell to lie in the path of sunlight through the cell and to strongly absorb visible sunlight transmitted through the cell and a second extreme light state in which said particles are maximally concentrated within the cell to remove them from the path of sunlight through the cell and to substantially transmit visible sunlight through the cell; and said coating is arranged to direct thermal radiation emitted by said charged particles to said environment in contact with said outer face, and said sealed cavity is arranged to direct thermal conduction diffusing from said charged particles to said environment in contact with said outer face.

2. An electrophoretic IGU as claimed in claim 1 wherein said electrophoretic device has at least one light state that is substantially transparent to visible light to provide visual access there through.

3. An electrophoretic IGU as claimed in claim 1 wherein said electrophoretic IGU is incorporated into a device including one of: a sunlight attenuator, a sunlight shutter, a sunlight modulator, a variable sunlight transmittance window, a variable sunlight rejection window, a variable sunlight reflectance window, a sunlight glare-avoidance window or an electro-active window.

4. An electrophoretic IGU as claimed in claim 1 wherein the coating is applied to the inner face of said electrophoretic laminate in contact with said sealed cavity.

5. An electrophoretic IGU as claimed in claim 1 wherein the coating is applied to the inner face of said pane in contact with said cavity.

6. An electrophoretic IGU as claimed in claim 1 where in use, in said first light state, said charged particles absorb sunlight energy causing heating and heat is transmitted substantially to said environment in contact with said outer face of said electrophoretic laminate.

7. An electrophoretic IGU as claimed in claim 1 where, in said second light state, said infrared cut-off wavelength of said coating provides a shortpass filter that determines the spectrum of transmitted sunlight and is adapted for an operating climate.

8. An electrophoretic IGU as claimed in claim 1 wherein said coating has one or more metallic or semiconductor layers, and preferably is a multi-layer coating including one or more metallic or semiconducting oxide layers and one or more dielectric or optical layers.

9. An electrophoretic IGU as claimed in claim 1 where, in a moderate-to-warm climate configuration, said electrophoretic laminate's outer face is in contact with an outside environment and said absorbed sunlight energy is transmitted to an outside environment to minimize solar heating of an inside environment.

10. An electrophoretic IGU as claimed in claim 1 where, in a cold climate configuration, said electrophoretic laminate's outer face is in contact with an inside environment and said absorbed sunlight energy is transmitted to an inside environment to maximize solar heating of an inside environment.

11. An electrophoretic IGU as claimed in claim 1 wherein said coating's cut-off wavelength is selected to substantially transmit the sunlight infrared spectrum, has a Light to Solar Gain ratio (LSG) of 1.15 or less, and comprises a low-emissivity coating.

12. An electrophoretic IGU as claimed in claim 1, wherein said coating's cut-off wavelength is selected to significantly reject the sunlight infrared spectrum, has an LSG of 1.25 or more, and comprises a spectrally selective coating.

13. An electrophoretic IGU as claimed in claim 1, wherein said coating contains one or more layers that have free electrons and possess a plasma wavelength that corresponds to a cut-off wavelength for infrared light transmission.

14. An electrophoretic IGU as claimed in claim 1, wherein said rejection of the sunlight infrared spectrum by said coating includes reflection, destructive interference, and absorption.

15. An electrophoretic IGU as claimed in claim 1, wherein said infrared cut-off wavelength is adjacent the thermal radiation spectrum and the sunlight spectrum from visible to infrared is substantially transmitted and thermal radiation substantially reflected.

16. An electrophoretic IGU as claimed in claim 1, wherein said infrared cut-off wavelength is adjacent the sunlight visible spectrum and the sunlight visible spectrum is substantially transmitted and the sunlight infrared and thermal radiation spectrums substantially rejected.

17. An electrophoretic IGU as claimed in claim 1, wherein said charged particles are wavelength selective; the particles strongly absorbing sunlight wavelengths shorter than a cut-off wavelength corresponding to visible sunlight and avoiding significant absorption of sunlight wavelengths greater than the cut-off wavelength corresponding to sunlight infrared; and, said particles' cut-off wavelength is within the range from 0.65 to 1.5 microns.

18. An electrophoretic IGU as claimed in claim 1 wherein said electrophoretic cell is sandwiched between a pair of transparent electrodes coated onto a pair of film substrates, and said electrophoretic cell comprises an electrophoretic ink comprising said charged particles suspended in a suspending fluid.

19. An electrophoretic IGU as claimed in claim 18 wherein said electrophoretic laminate comprises said electrophoretic film device assembled between a pair of adhesive layers and a pair of glass panes, each adhesive layer covering substantially the full surface of each pane and bonding an opposing face of said electrophoretic film device to a face of a pane.

20. An electrophoretic IGU as claimed in claim 18 wherein said electrophoretic laminate comprises said electrophoretic film device applied to a rigid pane using an adhesive layer, and said electrophoretic film device is in contact with said sealed cavity.

* * * * *